United States Patent
Sakai

(10) Patent No.: US 9,250,698 B2
(45) Date of Patent: Feb. 2, 2016

(54) IMAGE PROCESSING APPARATUS, IMAGE PROCESSING METHOD, IMAGE CAPTURE APPARATUS AND COMPUTER PROGRAM

(71) Applicant: SONY CORPORATION, Tokyo (JP)

(72) Inventor: Yusuke Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 14/067,172

(22) Filed: Oct. 30, 2013

(65) Prior Publication Data

US 2014/0139425 A1    May 22, 2014

(30) Foreign Application Priority Data

Nov. 19, 2012 (JP) ................................ 2012-252924

(51) Int. Cl.
*G06F 3/00* (2006.01)
*G06F 3/01* (2006.01)

(52) U.S. Cl.
CPC ................ *G06F 3/005* (2013.01); *G06F 3/011* (2013.01); *G06F 3/012* (2013.01); *G06F 3/017* (2013.01); *G06F 2203/011* (2013.01)

(58) Field of Classification Search
CPC ............. G06F 3/00; G06F 3/005; G06F 3/01; G06F 3/012; G06F 3/017; G06F 3/038; G06F 3/048; G06F 2203/011; G06F 2203/012; G06K 9/00355; G06K 9/3216; G06K 2209/27
See application file for complete search history.

(56) References Cited

U.S. PATENT DOCUMENTS

| | | | |
|---|---|---|---|
| 8,577,092 B2 * | 11/2013 | Kim et al. | 382/115 |
| 8,693,732 B2 * | 4/2014 | Eilat et al. | 382/103 |
| 2005/0110789 A1 * | 5/2005 | Le Ouay | A63F 13/10 345/419 |
| 2005/0285845 A1 * | 12/2005 | Dehlin | 345/173 |
| 2009/0138805 A1 * | 5/2009 | Hildreth | 715/745 |
| 2011/0093820 A1 * | 4/2011 | Zhang et al. | 715/863 |
| 2011/0273551 A1 * | 11/2011 | Yang et al. | 348/77 |
| 2011/0289456 A1 * | 11/2011 | Reville et al. | 715/830 |
| 2011/0298722 A1 * | 12/2011 | Tse et al. | 345/173 |
| 2012/0057746 A1 * | 3/2012 | Sakai et al. | 382/103 |
| 2012/0057792 A1 * | 3/2012 | Sakai et al. | 382/190 |
| 2012/0082339 A1 * | 4/2012 | Sakai et al. | 382/103 |
| 2012/0098927 A1 * | 4/2012 | Sablak | 348/36 |
| 2012/0113135 A1 * | 5/2012 | Sakai et al. | 345/619 |
| 2012/0218179 A1 * | 8/2012 | Oba et al. | 345/156 |
| 2012/0293405 A1 * | 11/2012 | Iida et al. | 345/156 |
| 2012/0315884 A1 * | 12/2012 | Forutanpour et al. | 455/414.2 |
| 2013/0057718 A1 * | 3/2013 | Tateishi et al. | 348/222.1 |
| 2013/0107051 A1 * | 5/2013 | Maruoka | H04N 7/183 348/148 |
| 2013/0219012 A1 * | 8/2013 | Suresh | G09G 5/14 709/217 |

FOREIGN PATENT DOCUMENTS

| | | | |
|---|---|---|---|
| JP | H11-024577 A | | 1/1999 |
| JP | 2003-157016 A | | 5/2003 |
| JP | 2008-287704 A | | 11/2008 |
| JP | 2009-105559 A | | 5/2009 |

(Continued)

*Primary Examiner* — Joe H Cheng
(74) *Attorney, Agent, or Firm* — Sony Corporation

(57) ABSTRACT

An image processing apparatus includes a usage state determination portion determining a usage state of a camera portion; and an object detection portion detecting an object from an image captured by the camera portion using a plurality of methods, in which the object detection portion detects the object from the captured image by prioritizing the plurality of methods based on the usage state.

10 Claims, 30 Drawing Sheets

(56) References Cited

FOREIGN PATENT DOCUMENTS

| | | | |
|---|---|---|---|
| JP | 4389956 B2 | 10/2009 | |
| JP | 2010-015553 A | 1/2010 | |
| JP | 2010-079332 A | 4/2010 | |
| JP | 2011-017738 A | 1/2011 | |
| JP | 2011-019051 A | 1/2011 | |

* cited by examiner

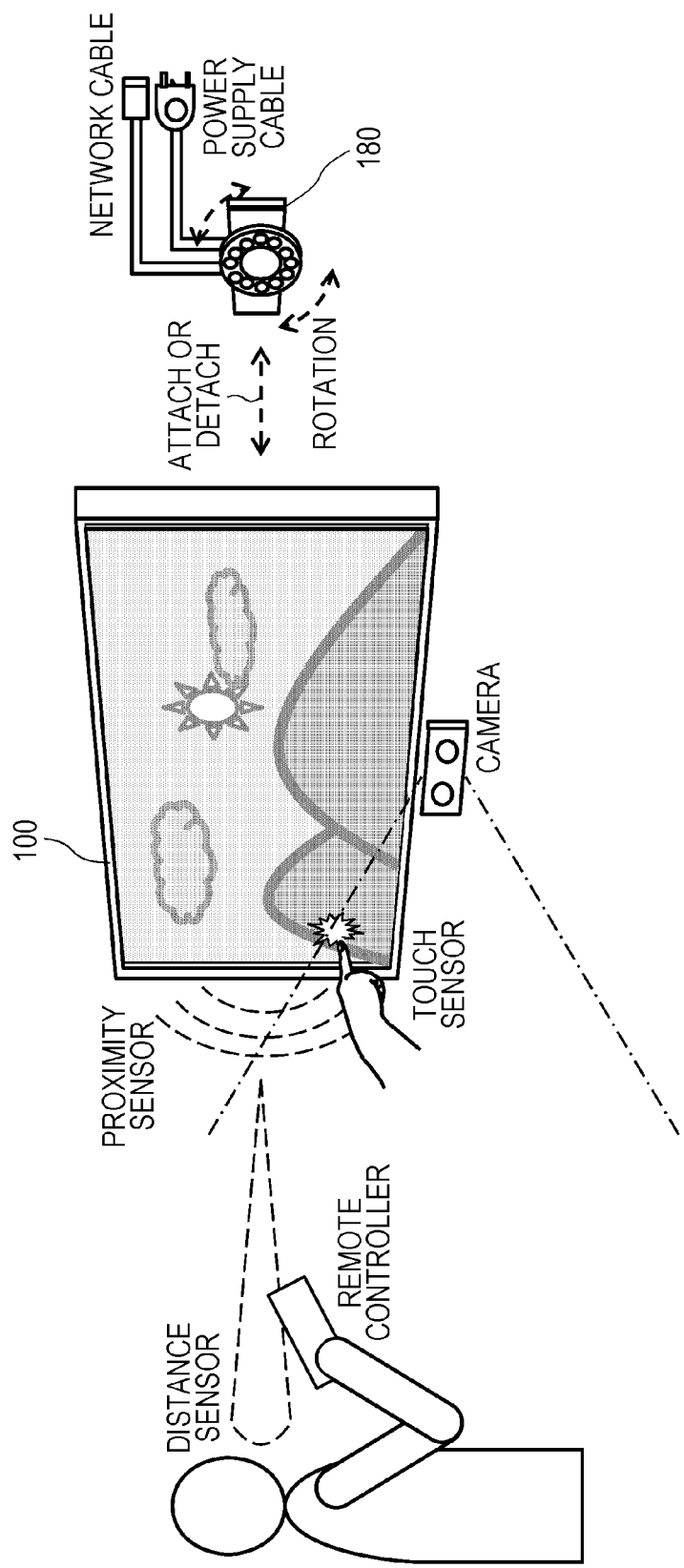

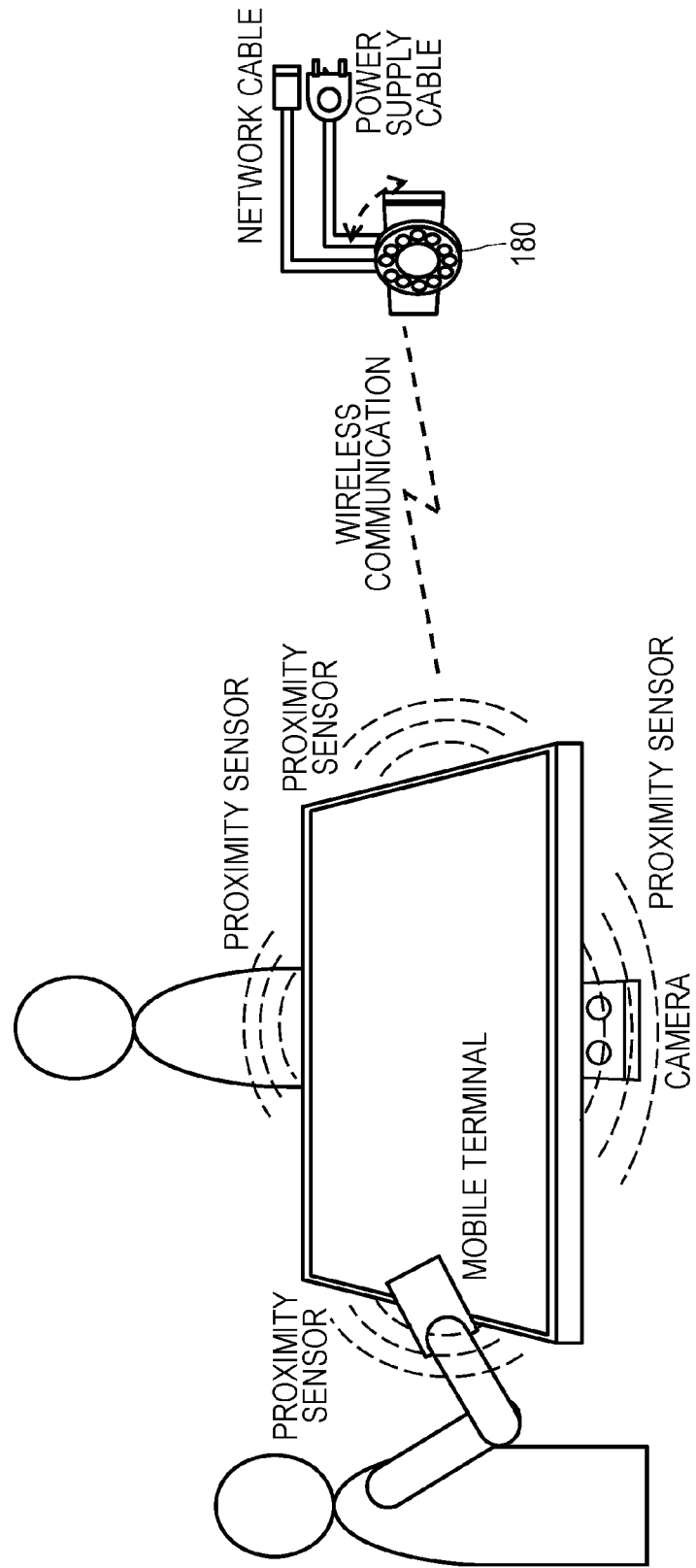

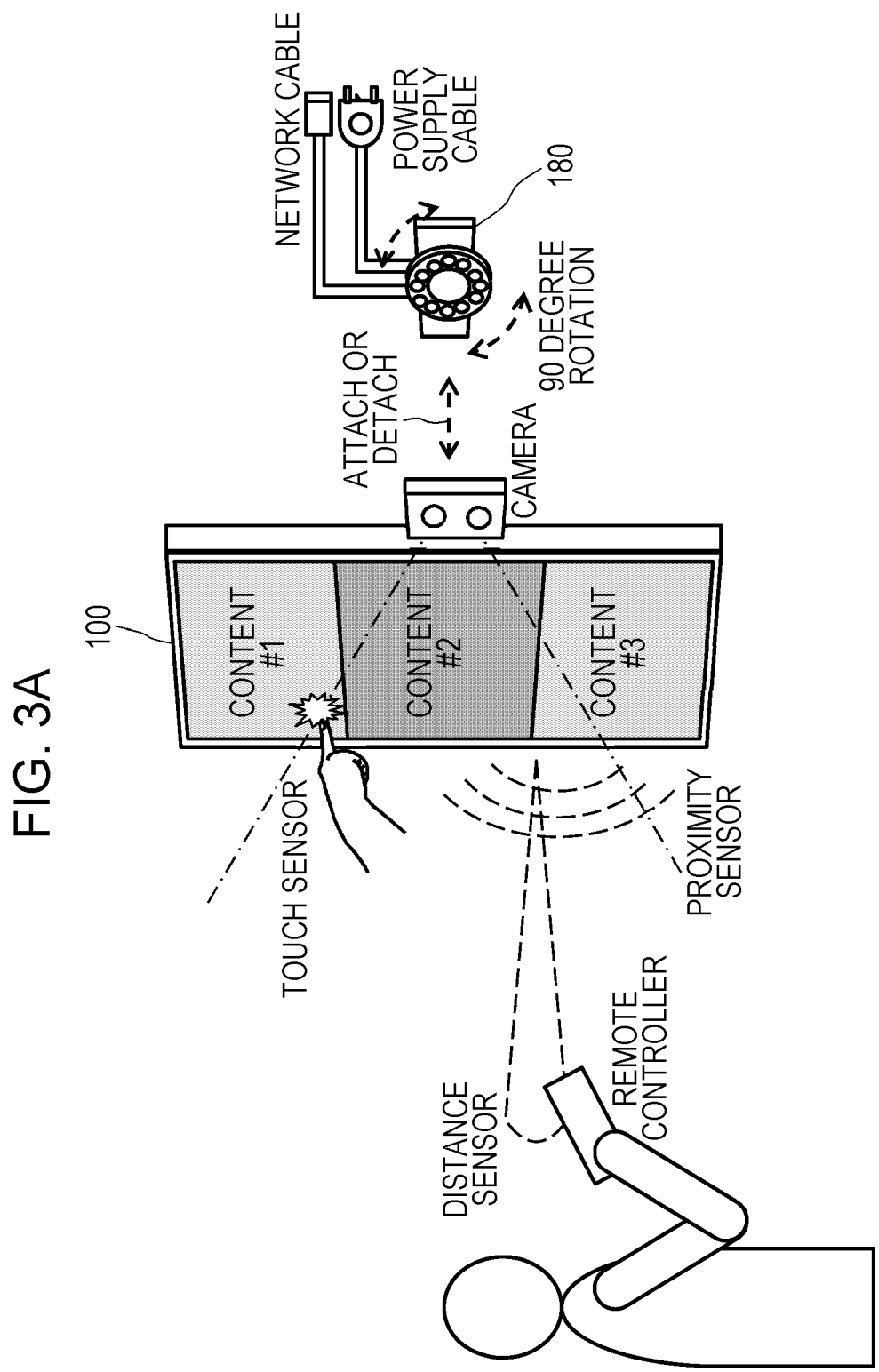

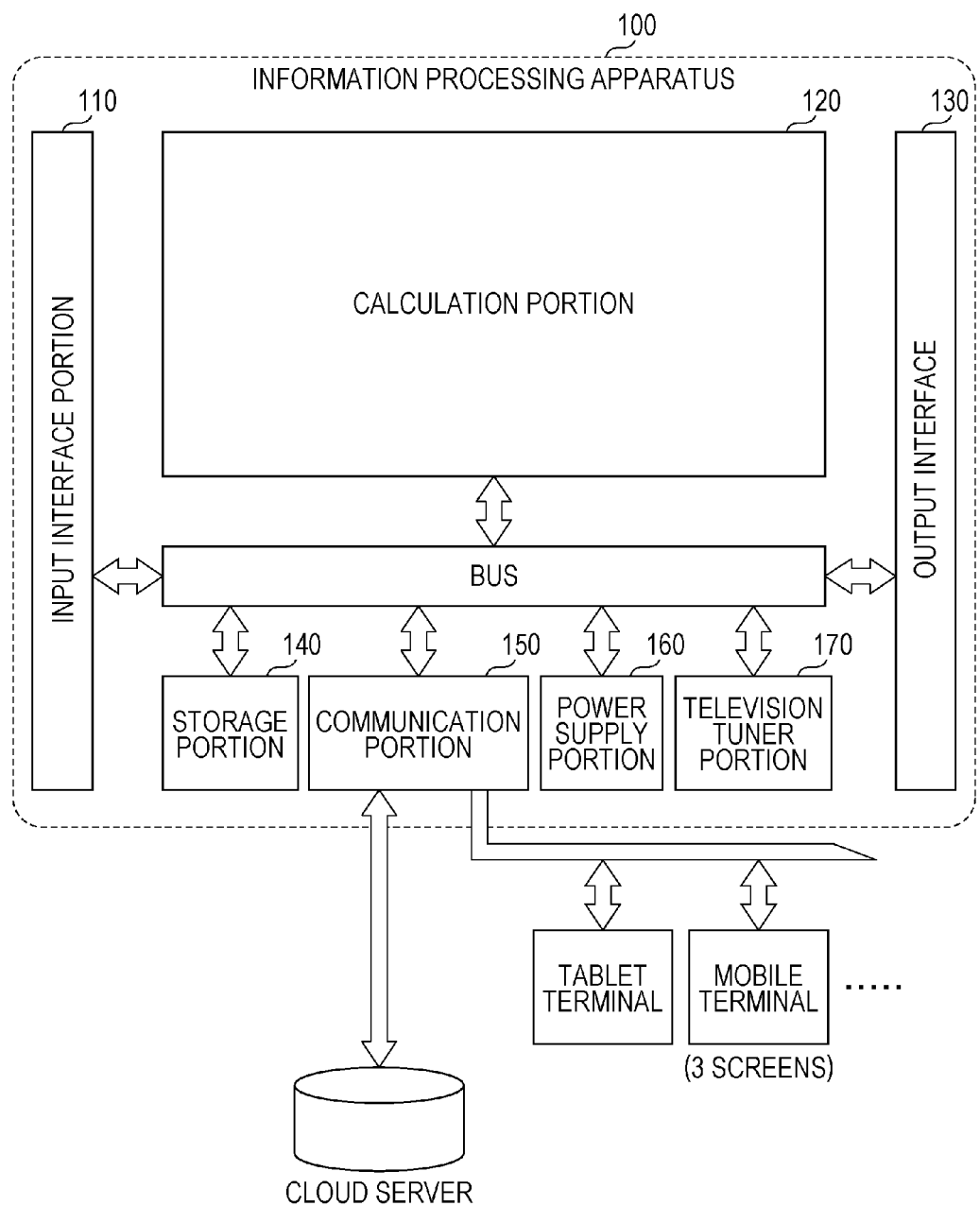

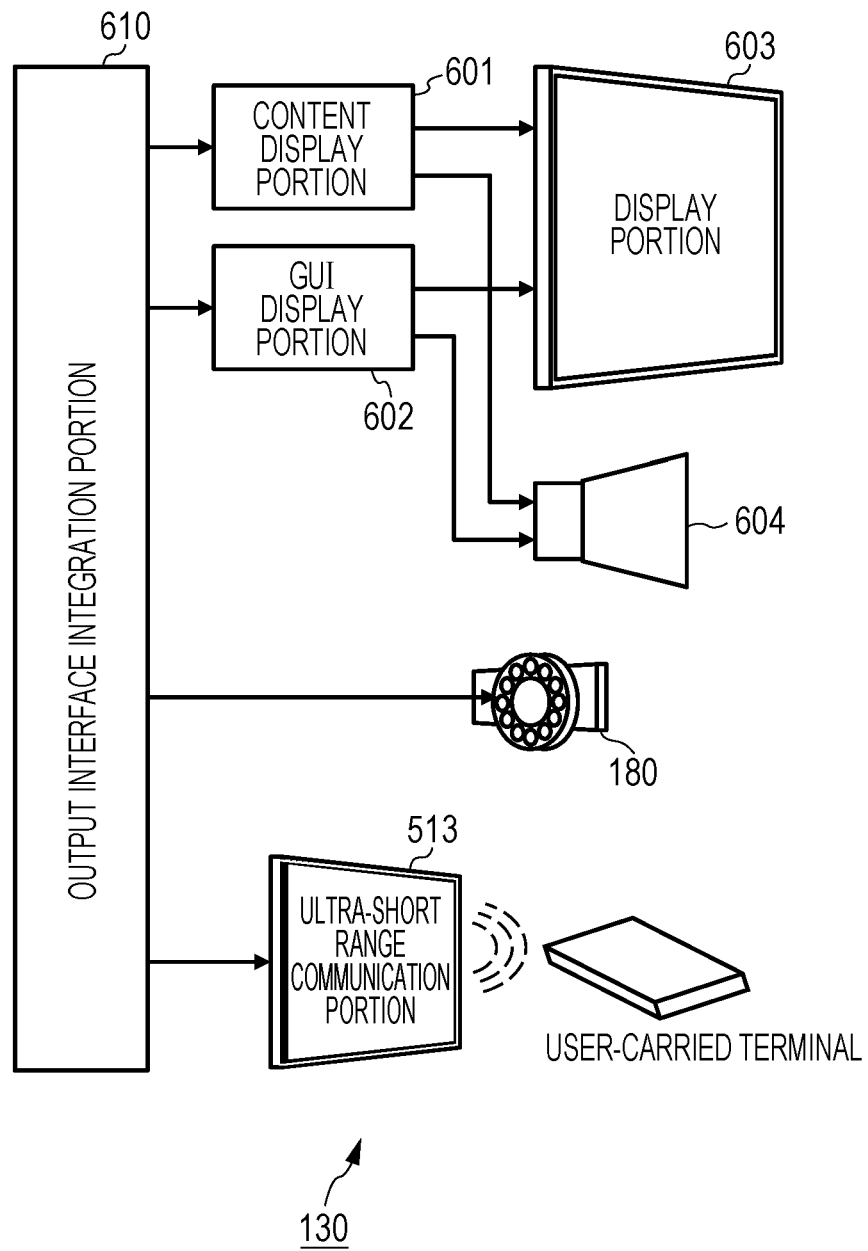

FIG. 11
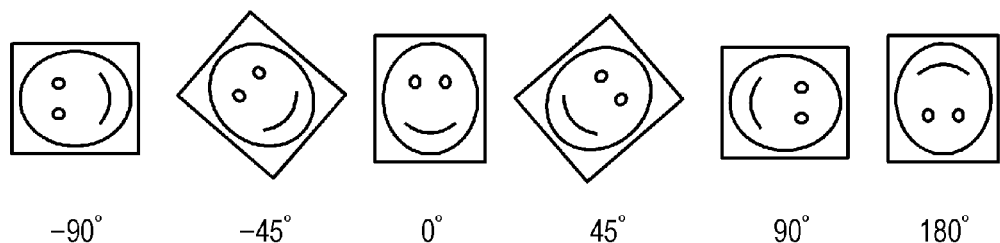
    −90°        −45°        0°        45°        90°       180°
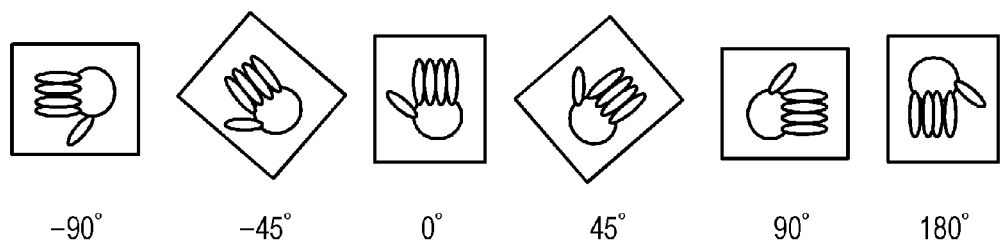
    −90°        −45°       0°        45°        90°      180°

FIG. 18
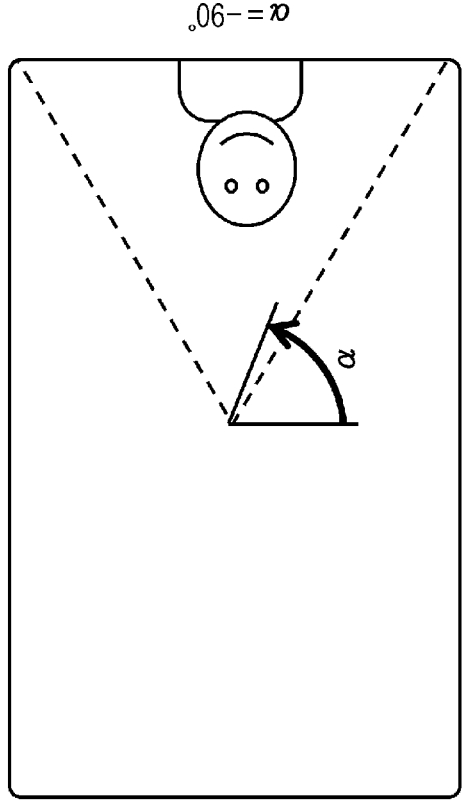
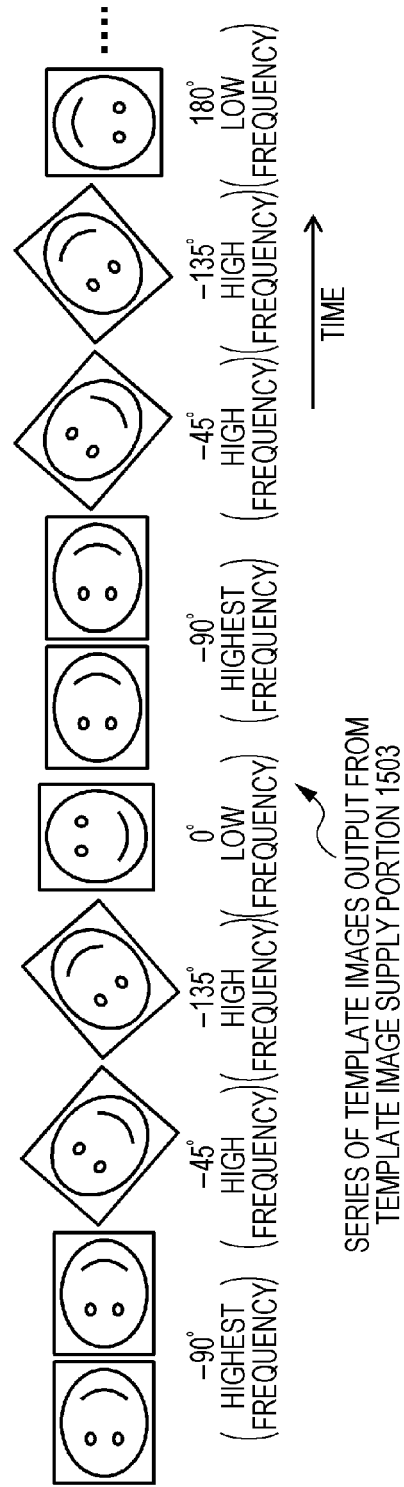

OPTICAL AXIS DIRECTION
$(\phi_c, \theta_c, \psi_c) = (0, 0, 0)$
OF IMAGE CAPTURED
CAMERA PORTION 503

OPTICAL AXIS DIRECTION
$(\phi_c, \theta_c, \psi_c) = (0, 0, 90°)$
OF IMAGE CAPTURED
CAMERA PORTION 503

OPTICAL AXIS DIRECTION
$(\phi_c, \theta_c, \psi_c) = (0, 0, 90°)$
OF IMAGE CAPTURED
CAMERA PORTION 503

IMAGE CAPTURED BY CAMERA PORTION 503
WITH OPTICAL AXIS DIRECTION
$(\phi_c, \theta_c, \psi_c) = (0, 0, 90°)$ AS
IMAGE DISPLAYED ON LARGE SCREEN
WITH OPTICAL AXIS DIRECTION OF
$(\phi_d, \theta_d, \psi_d) = (0, 0, 90°)$

CAPTURED IMAGE OPTIMIZED AND
DISPLAYED ON LARGE SCREEN

IMAGE PROCESSING APPARATUS, IMAGE PROCESSING METHOD, IMAGE CAPTURE APPARATUS AND COMPUTER PROGRAM

CROSS REFERENCE TO RELATED APPLICATION(S)

This application claims the benefit of Japanese Priority Patent Application JP 2012-252924 filed Nov. 19, 2012, the entire contents of which are incorporated herein by reference.

BACKGROUND

The technology disclosed in the present specification relates to an image processing apparatus and an image processing method processing an image captured by a camera, an image capture apparatus and a computer program, and, in particular, relates to an image processing apparatus and an image processing method detecting an object, such as a face image of a person included in an image, an image capture apparatus and a computer program.

In an environment in which people live, there are various products which are targets controlled by a user, such as domestic appliances or information devices. A gesture operation is one example of a method in which a user remotely operates this type of device.

For example, a remote operation apparatus capturing an image of an operator operating an operation display unit displaying an operation button or a menu, and detecting an operation by an operator based on the shape of a hand region and movement detected from the captured image, and display of the operation display unit has been proposed (for example, refer to Japanese Unexamined Patent Application Publication No. 2010-79332). According to the related art, it is possible to recognize a gesture of a user using the contours of a finger.

In addition, an image recognition apparatus has been proposed in which an operation of an operator is 3-dimensionally read with respect to a virtual operation surface, whether or not a movement is an operation is determined based on a positional relationship between a portion of an operator and a virtual operation surface, and if the motion of the operator is performed in any region of two or more virtual operation strata determined based on the positional relationship with the virtual operation surface, the content of the operation is determined based on the operation classification allocated in advance to the virtual operation stratum and the motion of an operator in the virtual operation stratum (for example, refer to Japanese Unexamined Patent Application Publication No. 2010-15553).

For a gesture operation, it is basic to analyze a gesture by recognizing a face or a hand of a user from an image of a user captured by a camera. Accordingly, it is considered to be possible to introduce gesture operations to various domestic appliances or information devices to which a camera is mounted.

A face recognition system, for example, is configured of two processes: a face recognition processes detecting the position of a face image and extracting the position as a detected face, and a face recognition process performing recognition of the detected face (specified as a person). Among the above processes, the face detection processes is a process in which a template image of a face or the like is scanned on an input image, and a detected face is extracted by pattern matching is in general use (for example, refer to Japanese Patent No. 4389956).

Incidentally, since if the face image in the input image is rotated with the optical axis of the camera as a center, pattern matching is not appropriately performed on the posture of template image, there is a problem in that the face detection accuracy is lowered. For example, in a case in which a camera is mounted to a device performing gesture operations and the device main body is supported by a rotating mechanism (for example, refer to Japanese Unexamined Patent Application Publication No. 11-24577, Japanese Unexamined Patent Application Publication No. 2003-157016 and Japanese Unexamined Patent Application Publication No. 2011-17738), it is assumed that a face image captured with an internal camera rotates.

Alternatively, also in a case in which the device to which the camera is mounted is a hand-held type, it is assumed that the posture of the camera changes according to the motion of the arm of the user, and that the subject image captured rotates.

For example, a face image detection apparatus has been proposed, which performs face detection by tracking changes in a face image using a plurality of reduced rotated image data items in which input image data is reduced and rotated to a plurality of angles (for example, refer to Japanese Unexamined Patent Application Publication No. 2008-287704). However, when performing pattern matching with a template image with respect to a plurality (n) of reduced rotated image data items, the processing amount is increased by n times.

In addition, when the inclination of a portable telephone is detected using an acceleration sensor (incline angle detection unit) and a face detection process is performed from a captured image, a portable electronic device with an attached camera performing face detection by a subject image for face detection being rotated based on detected incline information of the portable telephone or by changing the order in which pixels are read out has been proposed (for example, refer to Japanese Unexamined Patent Application Publication No. 2009-105559). However, even though the efficiency of the detection process itself increases, the processes in which the subject image is rotated increase. In addition, if pattern matching is not performed on a template image with respect to a subject image after rotation processing only, in a case in which the incline of the face of a subject does not match the incline information of the portable telephone, lowering of the detection precision is a concern.

SUMMARY

It is desirable to provide a superior image processing apparatus, image processing method, image capture apparatus and computer program enabling efficiently detecting an object, such as a face image of a person, from an image captured by a camera.

According to a first embodiment of the present technology, there is provided an image processing apparatus including a usage state determination portion determining a usage state of a camera portion; and an object detection portion detecting an object from an image captured by the camera portion using a plurality of methods, in which the object detection portion detects the object from the captured image by prioritizing the plurality of methods based on the usage state.

According to a second embodiment of the present technology, the image processing apparatus according to the first embodiment may be configured such that the object detection portion includes a plurality of template images, prioritizes the plurality of template images based on the usage state, and detects the object by performing pattern matching with the captured image on each template image with a frequency according to priority.

According to a third embodiment of the present technology, the image processing apparatus according to the second embodiment may be configured such that the usage state determination portion determines a posture when the camera portion captures an image of the object and, the object detection portion prioritizes a plurality of template images in which the inclination of the object is different according to the posture of the camera portion, and detects the object by performing pattern matching with the captured image on each template image in which the inclination is different with a frequency according to the priority.

According to a fourth embodiment of the present technology, the image processing apparatus according to the third embodiment may be configured such that the usage state determination portion determines a direction of the optical axis when the camera portion captures an image of the object, the object detection portion prioritizes each template image based on the determined direction of the optical axis, and detects the object by performing pattern matching with the captured image on each template image in which the inclination is different with a frequency according to the priority.

According to a fifth embodiment of the present technology, the image processing apparatus according to the fourth embodiment may be configured such that the usage state determination portion determines the angle of rotation of roll rotation of the optical axis of the camera portion, and the object detection portion applies a higher priority than the template image having an inclination close to the angle of rotation of roll rotation of the optical axis of the camera portion.

According to a sixth embodiment of the present technology, the image processing apparatus according to the third embodiment may be configured such that the object detection portion prioritizes each template image for each region of the captured image, and detects the object by performing pattern matching with the captured image on each template image in which the inclination is different with a frequency according to the priority.

According to a seventh embodiment of the present technology, the image processing apparatus according to the sixth embodiment may be configured such that when the optical axis of the camera portion faces the vertical direction, the object detection portion prioritizes each template image according to the angular position of the region with respect to the optical axis of the image capture apparatus for each region of the captured image.

In addition, according to an eighth embodiment of the present technology, there is provided an image processing apparatus including a usage state detection portion detecting a usage state of a camera portion; and an optimization portion optimizing an image captured by the camera portion based on the usage state.

According to a ninth embodiment of the present technology, the image processing apparatus according to the eighth embodiment may further include a display portion displaying the captured image on a screen. Then, the optimization portion optimizes the captured image in which an image of a user is captured so as to be displayed on the screen facing the user.

According to a tenth embodiment of the present technology, the image processing apparatus according to the ninth embodiment may be configured such that the usage state detection portion detects a direction of the optical axis of the camera portion and a direction of the optical axis of the screen, and the optimization portion optimizes the captured image based on the direction of the optical axis of the camera portion and the direction of the optical axis of the screen.

According to an eleventh embodiment of the present technology, the image processing apparatus according to the ninth embodiment may be configured such that the usage state detection portion detects the rotation $\Delta\Phi_c$ of roll axis rotation of the optical axis of the camera portion and the rotation $\Delta\Phi_d$ of roll rotation of the optical axis of the screen, and the optimization portion causes the captured image to rotate by $-(\Delta\Phi_c+\Delta\Phi_d)$ only to the $\Phi$ axis rotation.

In addition, according to a twelfth embodiment of the present technology, there is provided an image processing method including determining a usage state of a camera portion; and detecting an object from an image captured by the camera portion using a plurality of methods, in which in the detecting of the object, the object is detected from the captured image by prioritizing the plurality of methods based on the usage state.

In addition, according to a thirteenth embodiment of the present technology, there is provided an image processing method including detecting a usage state of a camera portion; and optimizing an image captured by the camera portion based on the usage state.

In addition, according to a fourteenth embodiment of the present technology, there is provided an image capture apparatus including a camera portion; a usage state determination portion determining a usage state of the camera portion; and an object detection portion detecting an object from an image captured by the camera portion using a plurality of methods; in which the object detection portion detects the object from the captured image by prioritizing the plurality of methods based on the usage state.

In addition, according to a fifteenth embodiment of the present technology, there is provided an image capture apparatus, including a camera portion; a usage state detection portion detecting a usage state of the camera portion; and an optimization portion optimizing an image captured by the camera portion based on the usage state.

In addition, according to a sixteenth embodiment of the present technology, there is provided a computer program recorded in a computer readable format, causing a computer to function as a usage state determination portion determining a usage state of a camera portion; and an object detection portion detecting an object from an image captured by the camera portion with a plurality of methods, in which the object detection portion detects the object from the captured image by prioritizing the plurality of methods based on the usage state.

In addition, according to a seventeenth embodiment of the present technology, there is provided a computer program recorded in a computer readable format, causing a computer to function as a usage state detection portion detecting a usage state of a camera portion; and an optimization portion optimizing an image captured by the camera portion based on the usage state.

The computer program according to the sixteenth and seventeenth embodiments is defined as a computer program recorded in a computer readable format so as to realize a predetermined process on a computer. In other words, by installing the computer program according to the sixteenth and the seventeenth embodiments on a computer, a cooperative action is exhibited on the computer and it is possible to obtain the same respective actions and effects as each image processing apparatus according to the first and eighth embodiments.

According to the technology disclosed in the present specification, it is possible to provide a superior image processing apparatus, image processing method, image capture apparatus and computer program enabling efficiently detecting an object, such as a face image of a person, from an image captured by a camera.

An image processing apparatus in which the technology disclosed in the present specification is applied searches for an object, such as a face, by a template image being scanned on an image captured by a camera; however, by controlling the usage frequency of each template image or the priority of the region in which the template image is scanned in the captured image along with preparing a plurality of template images with different inclinations, it is possible to efficiently detect an object.

Furthermore, other aims, characteristics and merits of the technology disclosed in the present specification will become clear by detailed description based on the embodiments and attached drawings of the present embodiment described later.

BRIEF DESCRIPTION OF THE DRAWINGS

FIG. 1 is a diagram showing one example (Wall) of a usage mode of an information processing apparatus having a large screen.

FIG. 2A is a diagram showing another example (Tabletop) of a usage mode of an information processing apparatus having a large screen.

FIG. 3A is a diagram showing another example of a usage mode of an information processing apparatus having a large screen.

FIG. 4 is a diagram schematically showing a functional configuration of an information processing apparatus.

FIG. 6 is a diagram showing an internal configuration of an output interface portion.

FIG. 11 is a diagram showing an example of a plurality of template images in which the vertical direction is respectively inclined by 0 degrees, ±45 degrees, ±90 degrees and 180 degrees only.

FIG. 18 is a diagram showing a condition in which each template image is supplied from a template image supply portion at a frequency according to the degree of priority in a usage state in which main body of an information processing apparatus is removed from a wall and placed flat.

DETAILED DESCRIPTION OF EMBODIMENTS

Below, embodiments of the technology disclosed in the present specification will be described in detail with reference to the drawings.

A. System Configuration

Figure 2B:
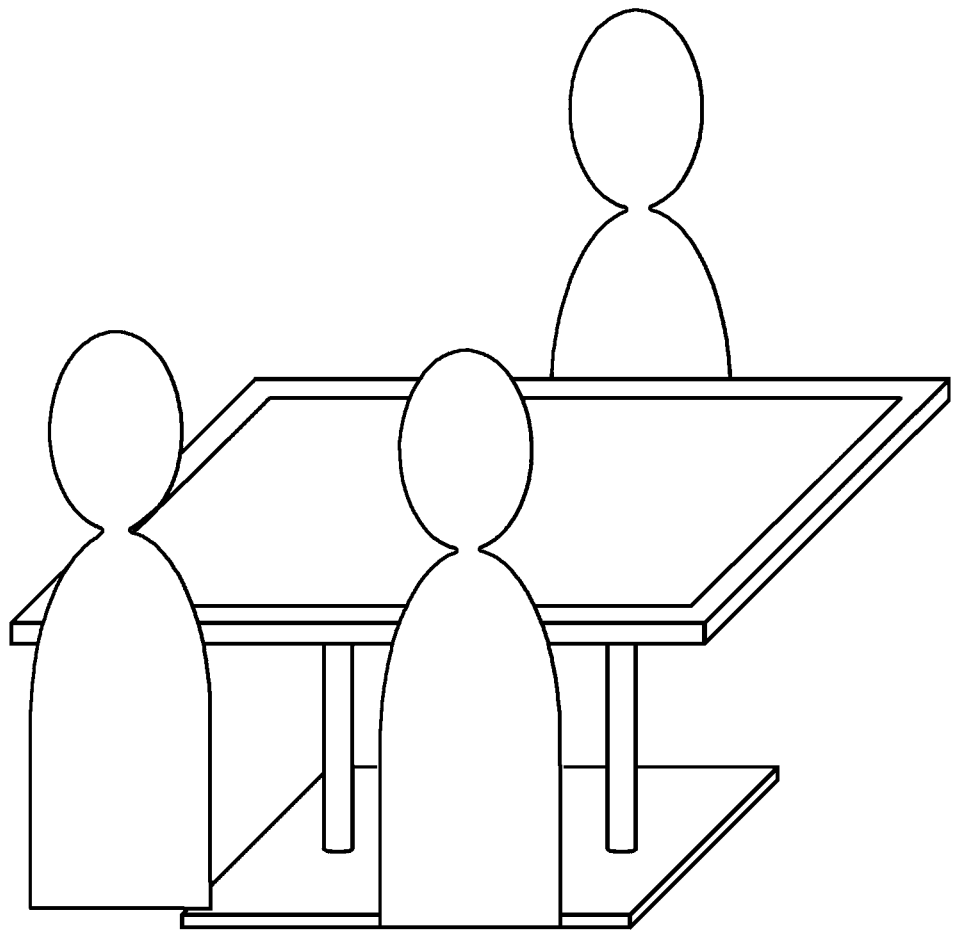
FIG. 2B is a diagram showing a use mode of a display screen of a tabletop state.

The information processing apparatus 100 according to the present embodiment has a large screen; however, it is assumed that the main usage states are "Wall" in which the screen is attached to a wall as shown in FIG. 1 and "Tabletop" in which the screen is placed on a table as shown in FIG. 2.

In the "Wall" state shown in FIG. 1, the information processing apparatus 100, for example, is attached in a rotatable and attachable and detachable state on a wall by a rotation/attachment mechanism portion 180. In the example shown, the rotation position is set to a posture in which the large screen is horizontal.

The rotation/attachment mechanism portion 180 combines the electrical contact point between information processing apparatus 100 and the outside, and a power supply cable or network cable (neither shown in the drawings) is connected to the information processing apparatus 100 via the rotation/attachment mechanism portion 180; the information processing apparatus 100 is able to access various servers on the Internet and able to receive driving power from a commercial AC power supply.

The information processing apparatus 100 includes a camera, distance sensor, proximity sensor and a touch sensor, and is able to ascertain the position of a user (distance, orientation) facing the screen. In addition, the information processing apparatus 100 is able to automatically select the optimal interaction according to the position of the user. For example, the information processing apparatus 100 automatically selects or adjusts the graphical user interface (GUI) display, such as a target operation object outline or the information density, according to the position of the user. In addition, the information processing apparatus 100 automatically selects from among a plurality of input sections, such as touching a screen, proximity, gestures using the hand or the like, a remote controller, or indirect operation according to the user state, according to the position of the user or the distance to the user.

In addition, the information processing apparatus 100 includes one or more cameras. In the example shown in the drawings, the camera is placed in the approximate center of the upper edge in a state in which the large screen is horizontal. In this state, the optical axis of the camera faces the horizontal direction, and the camera is able to capture an image of the figure of a user facing the large screen. By processing the image captured by the camera, it is possible to perform recognition of various objects, such as a person, object or device, in addition to being able to measure the position of a user. Based on the recognition results of a person, such as a face or a hand, it is possible to perform gesture input. In addition, the information processing apparatus 100 also includes an ultra-short range communication portion, and is able to perform direct and natural transmission and reception with a device carried by a user who approaches to a very short distance.

In the Wall state, a target operation object which is a target a user is operating is defined on the large screen. The target operation object has a specified display region of a functional module, such as moving image, still image or text content, as well as arbitrary Internet sites, applications or widgets. The target operation content includes received content of television broadcasts, reproduction content from a recording medium, streaming moving images acquired via a network, moving image and still image content obtained from another device, such as a mobile terminal carried by a user, or the like.

When the rotation position of the information processing apparatus 100 attached to a wall is set so that the large screen becomes horizontal as shown in FIG. 1, as a target operation object having a size of the entire screen, it is possible to display an image of a world view depicted in a movie almost as is.

When the information processing apparatus 100 is attached to the rotation/attachment mechanism portion 180 and rotated still in the state attached to the wall, it is possible to set a posture in which the large screen is vertical as shown in FIG. 3. The position of the camera moves to the approximate center of the right edge of the screen by being integrated with the main body of the information processing apparatus 100. In this state, the optical axis of the camera faces the horizontal direction, and the camera is able to capture an image of the figure of a user facing the large screen. However, since the optical axis of the camera is rotated 90 degrees with roll axis rotation, the captured images are also rotated by 90 degrees only.

Figure 3B:
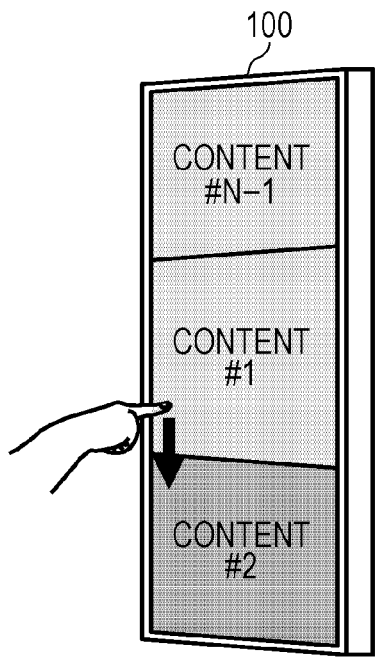
FIG. 3B is a diagram showing another example of a usage mode of an information processing apparatus having a large screen.
Figure 3C:
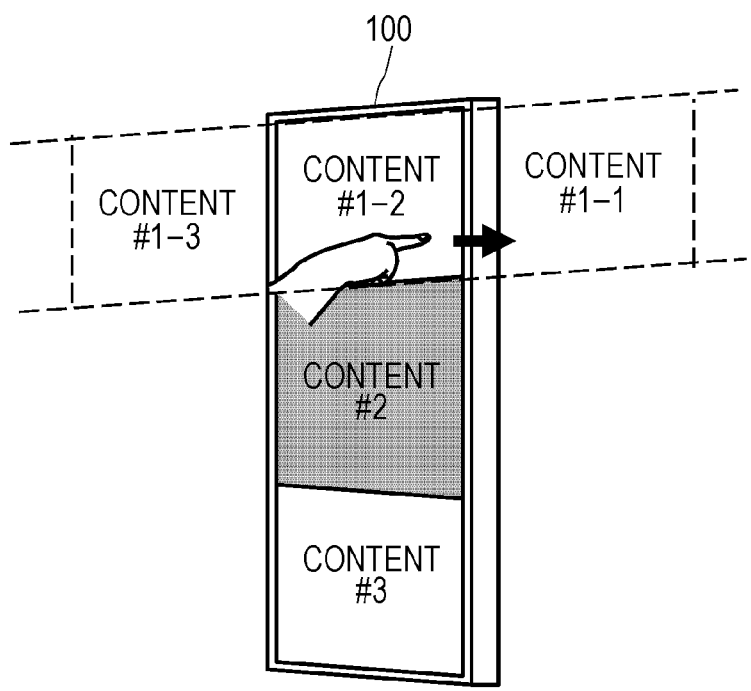
FIG. 3C is a diagram showing another example of a usage mode of an information processing apparatus having a large screen.

The aspect ratio of the large screen the information processing apparatus 100 is assumed to be 16:9 corresponding to a Hi-Vision image. When the large screen is set to a vertical posture, it is possible to arrange three screens with aspect ratios of 16:9 in the vertical direction, as shown in FIG. 3A. For example, it is possible to display at the same time 3 types of content #1 to #3 aligned in the vertical direction, such as broadcast content received at the same time from different broadcast station, reproduction content from a recording medium, or streaming moving images on a network. Furthermore, when the user, for example, performs an operation in the vertical direction on the screen with a finger tip, the content scrolls in the vertical direction as shown in FIG. 3B. In addition, when a user performs a left-right operation with the finger tip at a location in any of the three stages, the screen in that stage scrolls in the horizontal direction as shown in FIG. 3C.

Meanwhile, in the "Tabletop" state shown in FIG. 2A, the information processing apparatus 100 is placed flat on a table. In the usage state shown in FIG. 1, in contrast to the rotation/attachment mechanism portion 180 combining the electrical contact point (described above), the electrical contact point with the information processing apparatus 100 is not found in the state in which the apparatus is placed on a table as shown in FIG. 2A. Here, in the Tabletop state shown in the drawing, the information processing apparatus 100 may be configured to be operable by a built-in battery without a power supply. In addition, if the rotation/attachment mechanism portion 180 includes a wireless communication portion corresponding to a wireless local area network (LAN) access point function, as well as the information processing apparatus 100, for example, including a wireless communication portion corresponding to a wireless LAN mobile station function, the information processing apparatus 100 is able to access various servers on the Internet through wireless communication with the rotation/attachment mechanism portion 180 as an access point, even in the Tabletop state.

In the Tabletop state, a plurality of users is able to look at a displayed image from the four directions of the large screen. In addition, the optical axis of the camera faces the vertical direction, and captures images of scenery in the air above the large screen. In this case, the vertical direction of the face or the hand of a user in a captured image becomes mixed for each standing position of users viewing the screen, that is, for each region displayed in the captured image.

On the large screen in the Tabletop state, a plurality of target operation objects which are operation targets is defined. The target operation object has a specified display region of a functional module, such as moving image, still image or text content, as well as arbitrary Internet sites, applications or widgets.

The information processing apparatus 100 includes proximity sensors detecting the presence or state of a user at each of the four lateral edge portions of the large screen. Similarly to the above description, person recognition may be performed by capturing an image of a user approaching the large screen with the camera. In addition, the ultra-short range communication portion detects whether or not a user whose presence is detected is carrying a device such as a mobile terminal, and detects a data transmission and reception request from another terminal the user carries.

When the information processing apparatus 100 detects the presence of a user with a proximity sensor or the like, the detection result is used in UI control. If detecting not only if a user is present, but also the position or the like of the trunk, both hands and feet, or the head of the user, it is possible to use more detailed UI control. In addition, the information processing apparatus 100 also includes an ultra-short range communication portion, and is able to perform direct and natural transmission and reception with a device carried by a user who approaches to a very short distance.

If the screen of the information processing apparatus 100 is increased in size, in the Tabletop state, a surplus space for a plurality of user to perform touch input at the same time occurs. In addition, a plurality of users faces each other over a large screen, and it is possible to perform a meeting or a discussion while viewing the display of the screen (refer to FIG. 2B).

In FIG. 4, a functional configuration of the information processing apparatus 100 is shown. The information processing apparatus 100 includes an input interface portion 110 to which an information signal is input from the outside, a calculation portion 120 performing a calculation process for control or the like of a display screen based on the input information signal, an output interface portion 130 performing information output to the outside based on the calculation result, a high capacity storage portion 140 formed from a hard disk drive (HDD) or the like, a communication portion 150 connecting to an external network, a power source portion 160 handling driving power, and a television tuner portion 170. In the storage portion 140, various processing algorithms executed by the calculation portion 120 or various databases used by calculation portion 120 in the calculation process are stored.

Figure 5:
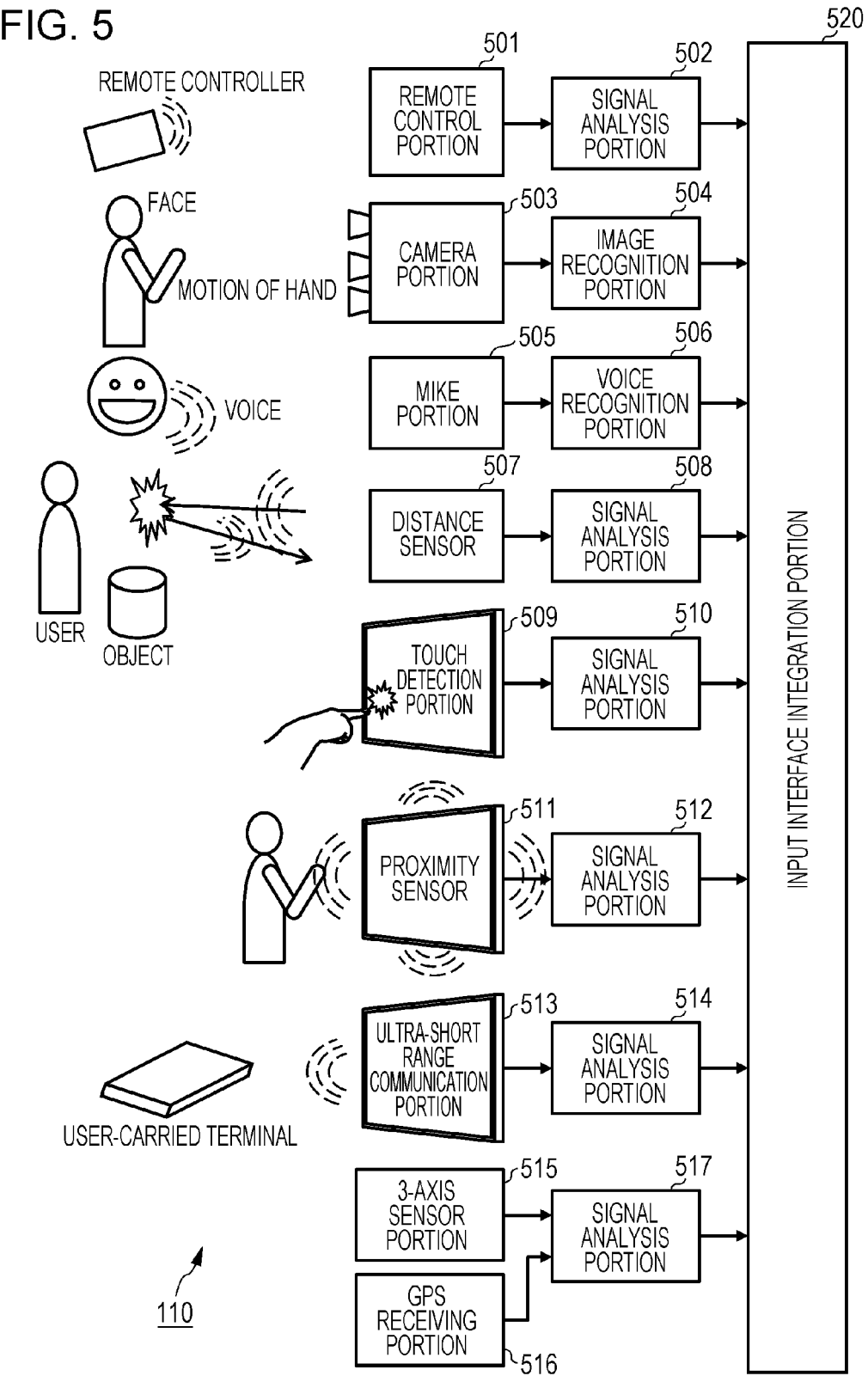
FIG. 5 is a diagram showing an internal configuration of an input interface portion.

The main functions of the input interface portion 110 are detection of the presence of a user, detection of a touch operation by a detected user of a screen, that is, of a touch panel, detection of a device, such as a mobile terminal, carried by a user and reception processing of sent data from the device. In FIG. 5, the internal configuration of an input interface portion 110 is shown.

A remote control receiving portion 501 receives remote control signals from a remote control or a mobile terminal. The signal analysis portion 502 obtains remote control commands by performing demodulating and decoding processes on the received remote control signals.

The camera portion 503 includes an image capture device, such as a complementary metal oxide semiconductor (CMOS) or charge coupled device (CCD), and employs one or both of monocular format or binocular format, or an active type. In addition, the camera portion 503 includes a camera control portions for panning or tilting, zooming or the like. The camera portion 503, as well as notifying the calculation portion 120 of camera information, such as panning or tilting, or zooming, is able to control panning, tilting, and zooming of the camera portion 503 according to camera control information from the calculation portion 120.

An image recognition portion 504 performs a recognition process on an image captured by the camera portion 503. Specifically, gesture recognition by detecting motion of the face or the hand of a user through background differences, recognition of an object, such as the face or hand of a user included in a captured image, and recognition of the distance to a user are performed.

The image recognition portion 504, during image recognition processing, detects an object which is a recognition object such as a face, by a template image being scanned on an image captured by the camera portion 503, and performing pattern matching. In the present embodiment, a plurality of template images with different inclinations is prepared, and the image recognition portion 504 is able to achieve increased efficiency in object detection processing and prevent erroneous detection in the captured image by controlling the usage frequency of each template image or the priority in which the template images are scanned by each region in the captured image according to the posture of the main body of the information processing apparatus 100 (that is, the camera portion 503 integrated with the main body). The object detection process will be described in detail later.

A mike portion 505 performs audio input of sound or conversation generated by a user. The voice recognition portion 506 performs voice recognition on audio signals input from the mike portion 505.

The distance sensor 507, for example, is formed from a Position Sensitive Detector (PSD), and detects a signal returned from a user or another object. The signal analysis portion 508 analyzes the detection signals, and measures the distance to the user or object. In addition to a PDS sensor, it is possible to use a pyroelectric sensor or a simple camera or the like for the distance sensor 507. The distance sensor 507 constantly monitors within a radius of, for example, 5 to 10 meters from the information processing apparatus 100 for whether or not a user is present. Therefore, in the distance sensor 507, it is preferable to use a sensor device with a low power consumption.

A touch detection portion 509 is formed from a touch sensor superimposed on the screen and outputs a detection signal from a location touched by the finger tip of a user. The signal analysis portion 510 obtains position information by analyzing the detection signal of the touch detection portion 509.

Proximity sensors 511 are arranged at each of the four lateral edges of the large screen, and, for example, detects the body of a user approaching a screen through electrostatic capacitance. The signal analysis portion 512 analyzes the detection signals of the proximity sensors 511.

The ultra-short range communication portion 513, for example, receives contactless communication signals from the device carried by the user using near field communication (NFC). The signal analysis portion 514 obtains received data by demodulating and decoding received signals of the ultra-short range communication portion 513.

A 3-axis sensor portion 515 is configured from a gyroscope or the like, and detects the posture of each of x, y and z axial rotations of the information processing apparatus 100. A Global Positioning System (GPS) reception portion 516 receives signals from GPS satellites. The signal analysis portion 517 analyzes signals from the 3-axis sensor portion 515 and the GPS reception portion 516, and obtains positional information and posture information for the information processing apparatus 100.

The input interface integration portion 520 integrates the input of the information signals and passes the result to the calculation portion 120. In addition, the input interface integration portion 520 integrates the analysis results of each signal analysis portion 508, 510, 512 and 514, and passes acquired positional information of users present around the information processing apparatus 100 to the calculation portion 120.

The main functions of the calculation portion 120 are calculation processing, such as a UI screen generation process based on user detection results by the input interface portion 110, touch detection results of the screen, and received data from the device carried by the user, and outputting the calculated results to the output interface portion 130. The calculation portion 120, for example, is able to realize calculation processing for each application by loading and executing application programs installed in the storage portion 140.

The main functions of the output interface portion 130 are display of content or the UI on a screen based on the calculation results of the calculation portion 120 and data transmission to the device carried by the user. In FIG. 6, the internal configuration of the output interface portion 130 is shown.

An output interface integration portion 610 integrates and handles information output based on the calculation results by the calculation portion 120.

The output interface integration portion 610 instructs image and audio output of moving image or still image content, such as received TV broadcast content or reproduced content from a recording medium such as Blu-ray disc, to the display portion 603 and speaker portion 604 with respect to the content display portion 601.

In addition, the output interface integration portion 610 instructs display of a GUI, such as a target operation object, to the display portion 603 with respect to the GUI display portion 602.

In addition, the output interface integration portion 610 instructs data transmission by contactless communication to the device carried by the user with respect to the ultra-short range communication portion 513.

The information processing apparatus 100 is able to detect a user based on recognition of an image captured by the camera portion 503 or detection signals of the distance sensor 507, the touch detection portion 509, the proximity sensor 511, the ultra-short range communication portion 513 or the like. In addition, it is possible to specify the person of the detected user by face recognition of an image captured by the camera portion 503 or recognition of the device carried by a user with the ultra-short range communication portion 513. It is possible for the specified user to log into the information processing apparatus 100. Naturally, it is also possible to limit the account able to be logged into to the specified user. In addition, the information processing apparatus 100 is able to use the distance sensor 507, the touch detection portion 509 and the proximity sensor 511 for different purposes according to the position of the user or the state of the user, and receive an operation from the user.

In addition, the information processing apparatus 100 is connected to an external network through a communication portion 150. It is not important whether the connection mode with the external network is wired or wireless. The information processing apparatus 100 is able to communicate with other devices, such as a mobile terminal, such as a smart phone carried by the user, or a tablet terminal, through the communication portion 150. It is possible to create a so-called "3-screen" configuration by combination of 3 types of apparatus of the information processing apparatus 100, the mobile terminal and the tablet terminal. The information processing apparatus 100 is able to provide a UI in which the three screens cooperate, on a larger screen than the other two screens.

For example, data transmission and reception of moving images, still images, text content, or the like, which are actual target operation objects, between the information processing apparatus 100 and the corresponding carried terminal by actions such as a user performing a touch operation on the screen or a carried terminal being made to approach the information processing apparatus 100 being performed in the background. Furthermore, a cloud server or the like is installed on the external network, and the 3 screens are able use the calculation ability of the cloud server or the like and to receive the benefit of cloud computing through the information processing apparatus 100.

B. Object Detection Process

In the information processing apparatus 100 according to the present embodiment, the image recognition portion 504 performs image recognition on an image captured by the camera portion 503, and is able to perform person identification based on face recognition or gesture input based on facial expression or shape recognition of the hand.

The image recognition portion 504, during image recognition processing, detects an object which is a recognition object such as a face, by a template image being scanned on an image captured by the camera portion 503, and performing pattern matching (described previously).

Incidentally, if the posture is not suitable, such as the face image in the captured image being rotated with the optical axis of the camera as a center, pattern matching is not achieved with the template image, and there is a problem in that the face detection accuracy is lowered.

In particular, since the information processing apparatus 100 according to the present embodiment is attached to the wall face in a rotatable and attachable and detachable state by the rotation/attachment mechanism portion 180, the optical axis of the camera portion 503 mounted on the main body of the apparatus 100 rotates to an arbitrary angle of rotation. Further, in a case in which an image of a user facing the large screen of the information processing apparatus 100 is captured by the camera portion 503, the face image of the user in the captured image is inclined according to the angle of rotation of the optical axis of the camera portion 503 even if the user does not change the posture of the face themselves. When the main body of the information processing apparatus 100 rotates with respect to the rotation/attachment mechanism portion 180, the optical axis of the camera portion 503 and the optical axis of the large screen rotate with roll axis rotation.

Figure 7A:
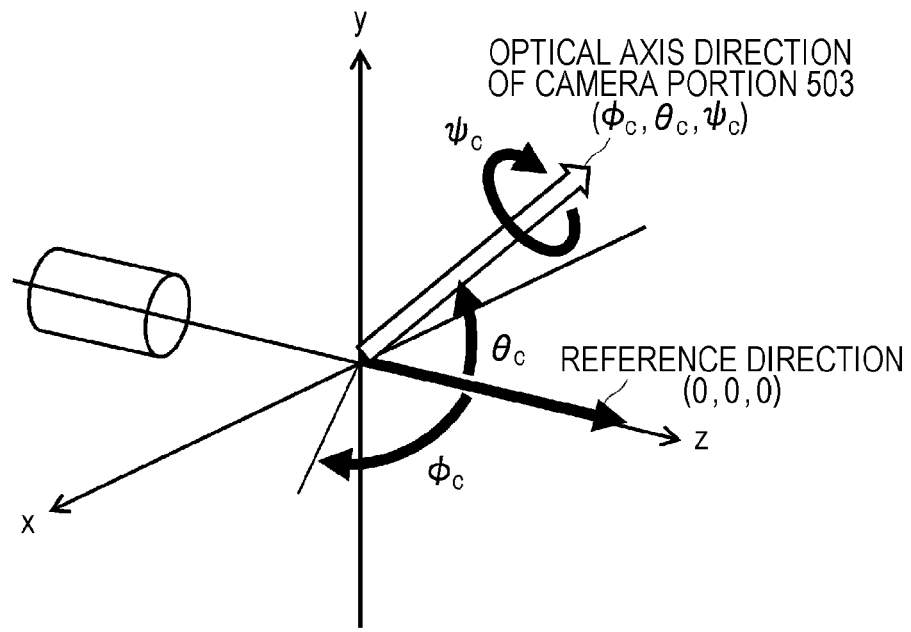
FIG. 7A is a diagram showing a definition of a direction $(\phi_c, \theta_c, \Phi_c)$ of the optical axis of a camera portion.
Figure 7B:
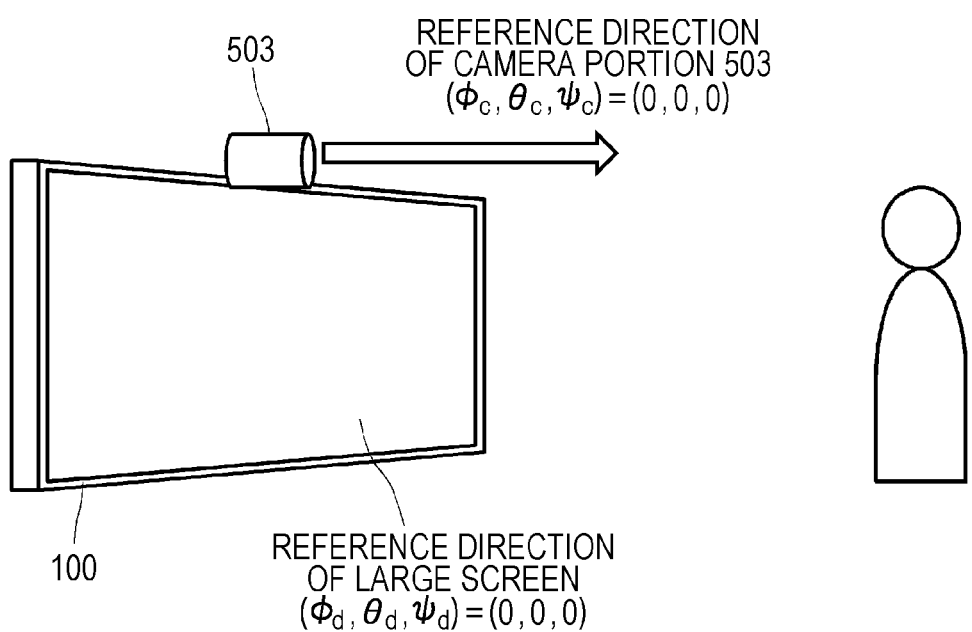
FIG. 7B is a diagram showing a reference direction (0, 0, 0) of the optical axis of the camera portion and the optical axis of a large screen.

Here, as shown in FIG. 7A, the direction ($\phi_c$, $\theta_c$, $\Phi_c$) of the optical axis of the camera portion 503 is defined on the x, y, and z planes. However, $\phi_c$ is set to 0 degrees in the positive direction on the z-axis on the xz plane, $\theta_c$ is set to 0 degrees in the positive direction on the z-axis on the yz plane, and $\Phi_c$ is set to 0 degrees in the positive direction on the y-axis on the xy plane. As shown in FIG. 1, in a state in which the large screen of the information processing apparatus 100 is horizontal, the camera portion 503 is fixed in the location in the approximate center of the upper edge of the screen. Below, the direction ($\phi_c$, $\theta_c$, $\Phi_c$) of the optical axis of the camera portion 503 is handled as matching the direction of the optical axis ($\phi_d$, $\theta_d$, $\Phi_d$) of the large screen. As shown in FIG. 7B, the direction facing forward in a state in which the large screen of the information processing apparatus 100 is defined as the reference direction (0, 0, 0) of the optical axis of the camera portion 503 and the optical axis of the large screen.

In a state in which the main body of the information processing apparatus 100 is attached to a wall, when the rotation position is set to a posture in which the large screen is horizontal as shown in FIG. 1, the direction of the optical axis of the camera portion 503 is the reference direction ($\phi_c$, $\theta_c$, $\Phi_c$)=(0, 0, 0). In addition, when the rotation position is set to a posture in which the larger screen is vertical as shown in FIG. 3, the direction of the optical axis of the camera portion 503 is ($\phi_c$, $\theta_c$, $\Phi_c$)=(0, 0, 90°).

Figure 8:
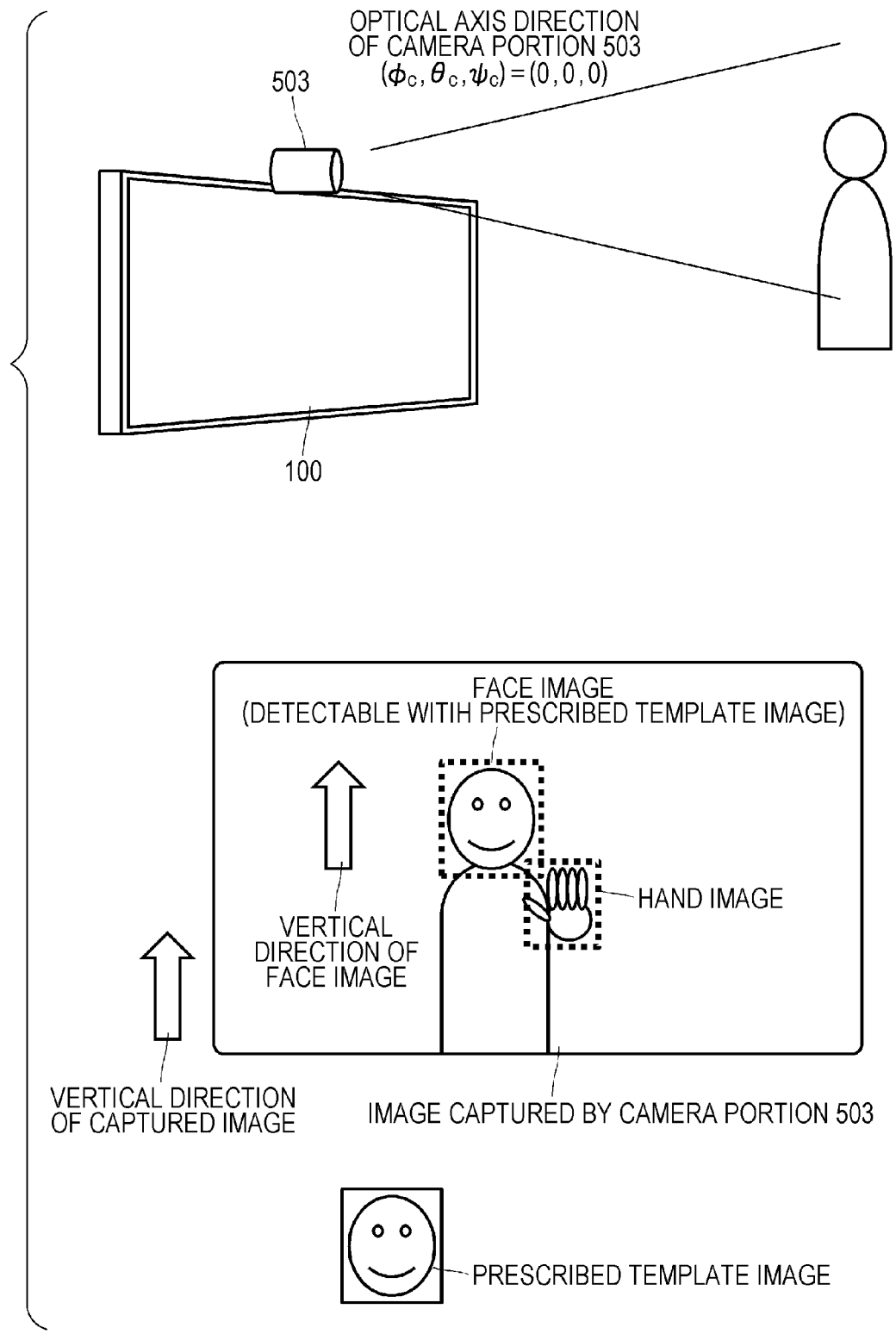
FIG. 8 is a diagram showing a condition in which an image of an upright user in front of a large screen is captured by a camera portion in which the direction of the optical axis is set to $(\phi_c, \theta_c, \Phi_c)=(0, 0, 0)$.

If an image of an upright user in front of the large screen is captured by the camera portion 503 with the direction of the optical axis set to ($\phi_c$, $\theta_c$, $\Phi_c$)=(0, 0, 0), the vertical direction of the face or hand of the user in the horizontal captured image matches the vertical direction of the captured image, as shown in FIG. 8. Accordingly, in the image recognition portion 504, it is possible to detect the face or hand of a user by performing pattern matching with a prescribed (that is, not inclined) template image.

Figure 9:
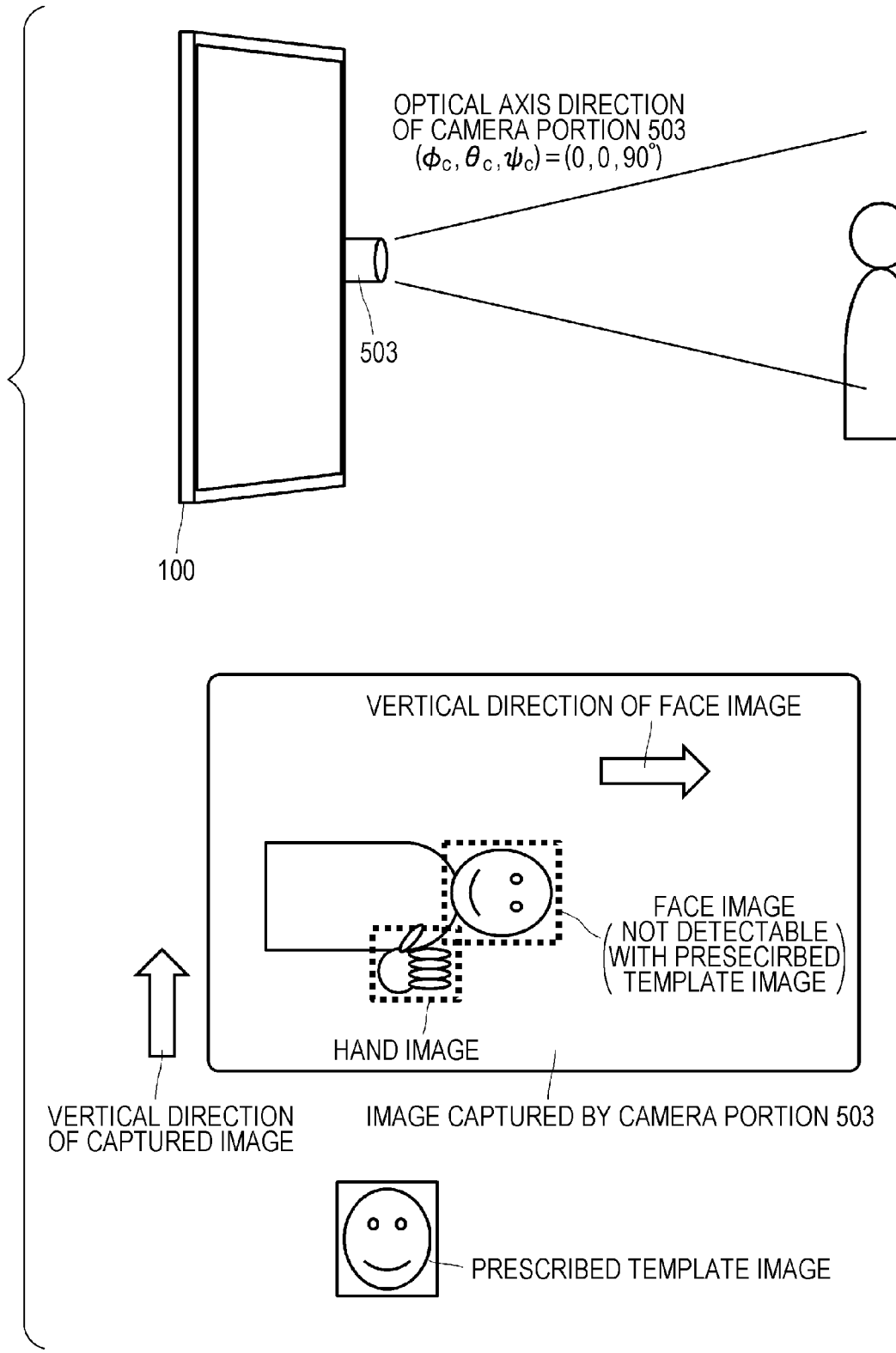
FIG. 9 is a diagram showing a condition in which an image of an upright user in front of a large screen is captured by a camera portion in which the direction of the optical axis is set to $(\phi_c, \theta_c, \Phi_c)=(0, 0, 90°)$.

Meanwhile, when an image is captured of an upright user in front of the large screen by the camera portion 503 with the direction of the optical axis set to ($\phi_c$, $\theta_c$, $\Phi_c$)=(0, 0, 90°), as shown in FIG. 9, the vertical direction of the face or hand of the user in the horizontal captured image is rotated by 90 degrees only using roll axis rotation (clockwise from the upper portion of the drawing) from the vertical direction of the captured image. Accordingly, in the image recognition portion 504, even if pattern matching is achieved with the prescribed (that is, inclination is fixed) template image, the degree of the match is low and it is difficult to detect the face or hand of the user.

Figure 10:
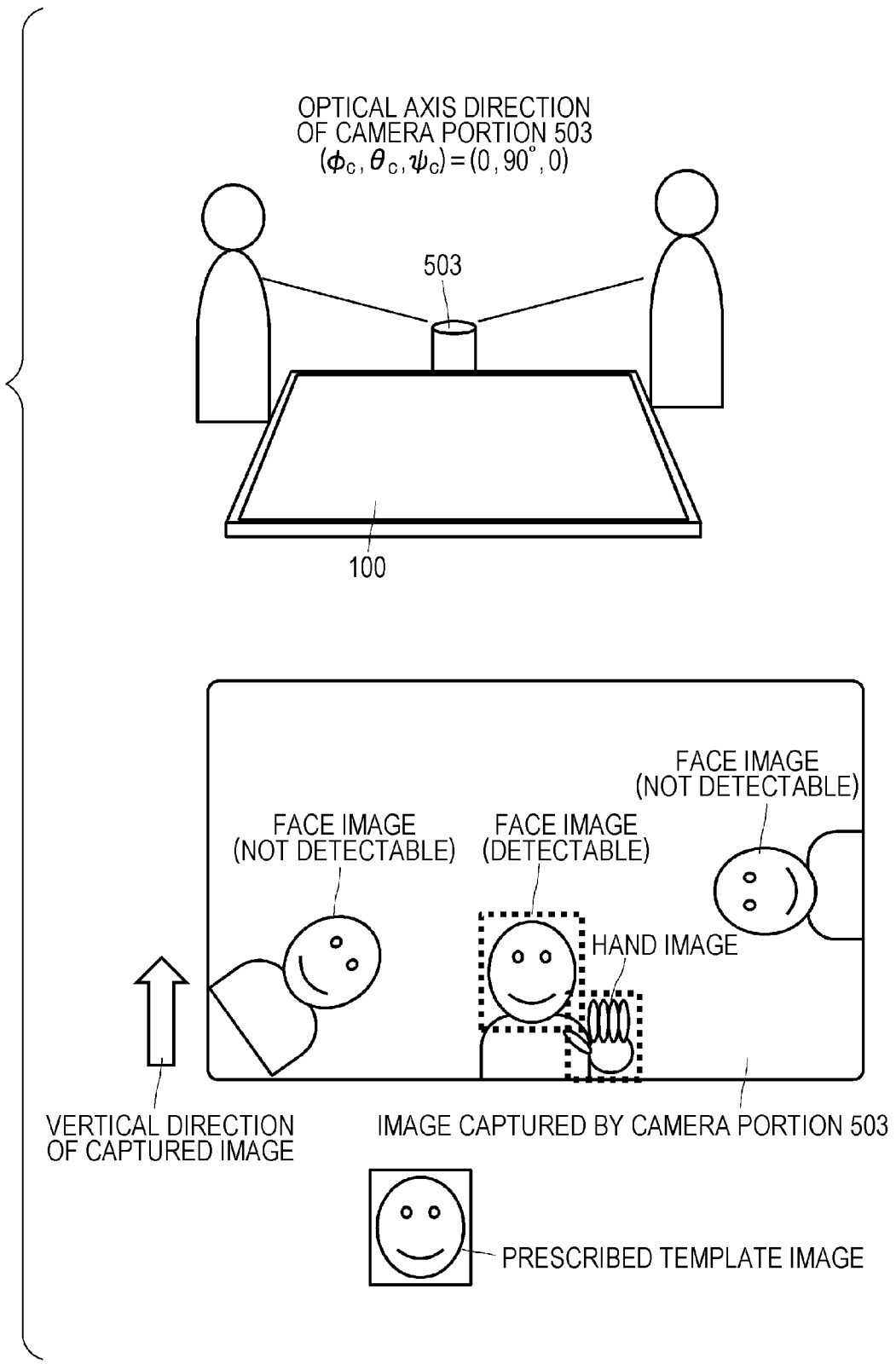
FIG. 10 is a diagram showing a condition in which an image of a plurality of users looking at a display image from four directions of a large screen is captured by a camera portion in which the direction of the optical axis is set to $(\phi_c, \theta_c, \Phi_c)=(0, 90°, 0)$.

In addition, in a state in which the main body of the information processing apparatus 100 is removed from the wall and is in the Tabletop, that is, the larger screen is placed flat, state, the direction of the optical axis of the camera portion 503 is ($\phi_c$, $\theta_c$, $\Phi_c$)=(0, 90°, 0); however, a plurality of users is able to view displayed images from the four directions of the large screen. An example of the image captured by the camera portion 503 at this time is shown in FIG. 10; however, the vertical direction of the face or the hand of a user in a captured image is mixed for each standing position of users viewing the screen, that is, for each region displayed in the captured image. Therefore, even if pattern matching is achieved with the prescribed (that is, inclination is fixed) template image, the degree of the match is low and there are regions where it is difficult to detect the face or hand of a user.

In a system without strict restrictions on the calculation processing amount, detection processing may be performed with reference to all the inclinations of the face and all the orientations of the hand which are assumed; however, there is an extremely high processing load due to the assumed angles.

In the actual usage state of the information processing apparatus 100, the vertical direction of the face image or hand image in the captured image is not inclined to their respective angles at a uniform frequency, and it is thought that there are high frequency inclinations, low frequency inclinations and inclinations that rarely occur. Accordingly, it is inefficient to perform detection processing of a face image or hand image with reference to assuming all angles. In addition, even for low frequency inclinations, performance of detection processing similarly to high frequency inclinations does not further increase that processing load.

For example, in a usage state in which the main body of the information processing apparatus 100 is attached to the wall such that the large screen is arranged horizontal (that is, the direction of the optical axis of the camera portion 503 is ($\phi_c$, $\theta_c$, $\Phi_c$)=(0, 0, 0)), if a user is considered to normally be upright on the floor, the vertical direction of most face images and hand images in a captured image matches the vertical direction of a captured image. The vertical direction of the face image inclining to about 45 degrees due to the user tilting their head or performing a gesture occurs at a comparatively high frequency. In addition, the vertical direction of the face image inclining to about 90 degrees, in cases in which the user is lying down, or the like, occurs at a low frequency. However, the vertical direction of the face image being completely reversed, that is, inclined by 180 degrees, can be said to be equivalent to not occurring.

In addition, in a usage state in which the main body of the information processing apparatus 100 is attached to the wall such that the screen is arranged vertical (that is, the direction of the optical axis of the camera portion 503 is ($\phi_c$, $\theta_c$, $\Phi_c$)=(0, 0, 90°)), if a user is considered to normally be upright on the floor, the vertical direction of most face images and hand images in a captured image is inclined by only 90 degrees with respect to vertical direction (that is, with roll axis rotation) of a captured image. The vertical direction of the face image inclining to about 45 degrees due to the user tilting their head or performing a gesture occurs at a comparatively high frequency. In addition, the vertical direction of the face image inclining to about 90 degrees, in cases in which the user is lying down, or the like, occurs at a low frequency. However, the vertical direction of the face image matching or being completely reverse to the vertical direction of the captured image (that is, the inclination is 0 degrees or 180 degrees), in cases in which the user is lying down, or the like, can be said to occur at a low frequency.

On the other hand, in a usage state in which the main body of the information processing apparatus 100 is removed from the wall and in Tabletop state, that is, placed flat (that is, the direction of the optical axis of the camera portion 503 is ($\phi_c$, $\theta_c$, $\Phi_c$)=(0, 90°, 0)), if a plurality of users is considered to be viewing displayed images from the four directions of the large screen, the vertical direction of most face images and hand images in a captured image matches the direction in which the user is viewing the large screen (in other words, the image capture face of the camera portion 503). The direction in which the user views the image capture face of the camera portion 503 corresponds to the angular position (tentatively set to angle $\alpha$) of the user with respect to the direction $\Phi_c$ of the optical axis of the camera portion 503. The vertical direction of the face image inclining to about ±45 degrees with respect to $\alpha$ due to the user tilting their head or performing a gesture occurs at a comparatively high frequency. However, the vertical direction of the face image inclining to about ±90 degrees with respect to $\alpha$, in cases in which the user is lying down, or the like, occurs at a low frequency. In addition, the vertical direction of the face image being completely reversed to $\alpha$, that is, inclined by 180 degrees, can be said to be equivalent to not occurring.

Here, in the present embodiment, as shown in FIG. 11, a plurality of template images in which the vertical direction is inclined by 0 degrees, ±45 degrees, ±90 degrees and ±180 degrees is prepared for each detection object, such as a face or a hand. Further, the image recognition portion 504 prioritizes each of the plurality of template images according to the actual usage state of the information processing apparatus 100, scans each template image using a frequency according to the priority, and performs a detection process of a desired object, such as a face or hand of a user. It is possible to increase the detection efficiency and detection precision by using a template image with an incline with a high probability of appearing at a high frequency. In addition, it is possible to reduce the processing load by using a template image with a low probability of appearing at a low frequency.

Here, the usage state of the information processing apparatus 100 signifies the main body of the information processing apparatus 100 in the Wall state, that is, a state attached to a wall, or the Tabletop state, that is, a state placed flat. In addition, in a case in which the main body of the information processing apparatus 100 is in a state attached to a wall, whether the large screen is horizontal or vertical, that is, the rotation position $\Phi_c$ of the optical axis (roll axis rotation) of the camera portion 503 also signifies the usage state. In addition, in a case in which the main body of the information processing apparatus 100 is in a state placed flat, the direction in which a user views the large screen also signifies the usage state, and is represented by the angular position $\alpha$ with respect to the direction $\Phi_c$ of the optical axis of the camera portion 503. In short, the usage state of the information processing apparatus 100 may be expressed in other words as the direction $(\phi_c, \theta_c, \Phi_c)$ of the optical axis of the camera portion 503.

Figure 12:
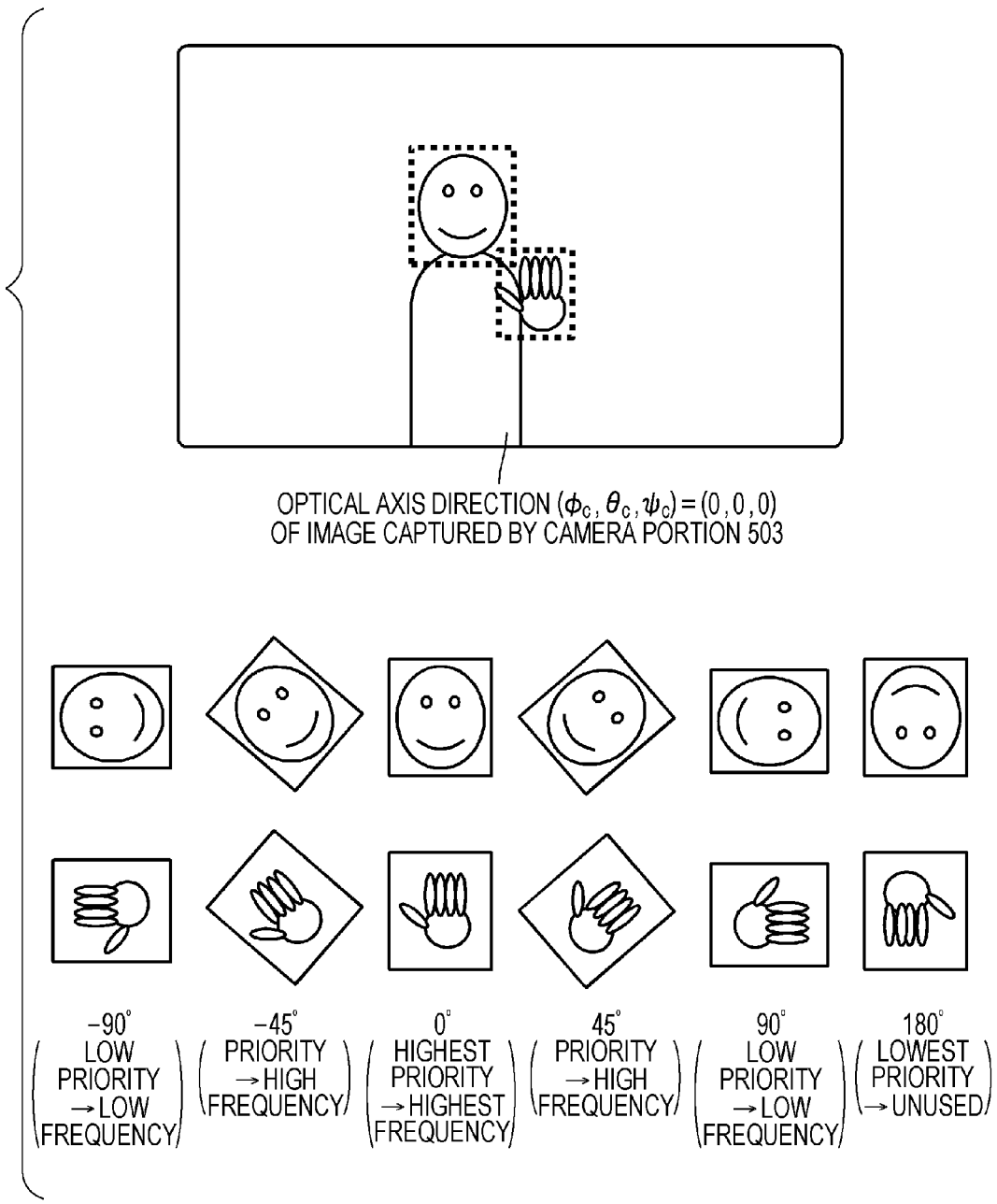
FIG. 12 is a diagram showing a degree of priority set for each template image in a usage state in which the direction of the optical axis of a camera portion is set to $(\Phi_c, \theta_c, \Phi_c)=(0, 0, 0)$.

For example, in a state in which the main body of the information processing apparatus 100 is attached to a wall such that the large screen is arranged horizontal, and the direction of the optical axis of the camera portion 503 is set to $(\phi_c, \theta_c, \Phi_c)=(0, 0, 0)$, the vertical direction of most face images and hand images in a captured image matches the vertical direction of the captured image. Here, a template image with an inclination of 0 degrees is set to the highest degree of priority. In addition, the vertical direction of the face image inclining to about 45 degrees due to the user tilting their head or performing a gesture occurs at a comparatively high frequency. Accordingly, a template image with an inclination of ±45 degrees is set to a high degree of priority. In addition, the vertical direction of the face image inclining to about 90 degrees, in cases in which the user is lying down, or the like, occurs at a low frequency. Here, a template image with an inclination of ±90 degrees is set to a low degree of priority. In addition, the vertical direction of the face image being completely reversed, that is, inclined by 180 degrees, is equivalent to not occurring. Here, a template image with an inclination of 180 degrees is set to the lowest degree of priority. In FIG. 12, the degree of priority set for each template image in a usage state in which the direction of the optical axis of a camera portion 503 is set to $(\phi_c, \theta_c, \Phi_c)=(0, 0, 0)$ is shown. The image recognition portion 504 uses each template image at a frequency according to the respective degree of priority, and performs detection processing of an object, such as a face or a hand, from an image captured by the camera portion 503.

In a state in which the main body of the information processing apparatus 100 is attached to a wall such that the large screen is arranged vertical, and the direction of the optical axis of the camera portion 503 is set to $(\phi_c, \theta_c, \Phi_c)=(0, 0, 90°)$, the vertical direction of most face images and hand images in a captured image is inclined by 90 degrees only with respect to the vertical direction of the captured image (or roll axis rotation). Here, a template image with an inclination of 90 degrees is set to the highest degree of priority. In addition, the vertical direction of the face image inclining to about 45 degrees due to the user tilting their head or performing a gesture occurs at a comparatively high frequency. Accordingly, a template image with an inclination of 45 degrees (and 135 degrees) is set to a high degree of priority. In addition, the vertical direction of the face image inclining to about 90 degrees, in cases in which the user is lying down, or the like, occurs at a low frequency. Here, a template image with an inclination of 0 degrees and 180 degrees is set to a low degree of priority. In addition, the vertical direction of the face image matching or being completely reverse to the vertical direction of the captured image, in a case in which the user is lying down, occurs at a low frequency. Here, a template image with an inclination of 270 degrees is set to the lowest degree of priority (refer to FIG. 13).

On the other hand, in a usage state in which the main body of the information processing apparatus 100 is removed from the wall and placed flat and the direction of the optical axis of the camera portion 503 is set to $(\phi_c, \theta_c, \Phi_c)=(0, 90°, 0)$, the vertical direction of most face images and hand images in a captured image matches the direction in which the user is viewing the large screen (in other words, the image capture face of the camera portion 503).

Here, the direction in which the user views the image capture face of the camera portion 503 corresponds to the angular position $\alpha$ of the user with respect to the direction $\Phi_c$ of the optical axis of the camera portion 503. The vertical direction of the face image inclining to about ±45 degrees with respect to $\alpha$ due to the user tilting their head or performing a gesture occurs at a comparatively high frequency. However, the vertical direction of the face image inclining to about ±90 degrees with respect to $\alpha$, in cases in which the user is lying down, or the like, occurs at a low frequency. In addition, the vertical direction of the face image being completely reversed to $\alpha$, that is, inclined by 180 degrees, is equivalent to not occurring.

For example, in regions in which the angular position $\alpha$ of the user is in the vicinity of 0 degrees, a template image with an inclination of 0 degrees is set to the highest degree of priority, a template image with an inclination of ±45 degrees is set to a high degree of priority, template images with an inclination of ±90 degrees are set to a low degree of priority, and a template image with an inclination of 180 degrees is set to the lowest degree of priority. In addition, in regions in which the angular position $\alpha$ of the user is in the vicinity of −90 degrees, a template image with an inclination of −90 degrees is set to the highest degree of priority, template images with an inclination of −45 degrees and −135 degrees are set to a high degree of priority, template images with an inclination of 0 degrees and 180 degrees are set to a low degree of priority, and a template image with an inclination of 90 degrees is set to the lowest degree of priority. In addition, in regions in which the angular position $\alpha$ of the user is in the vicinity of 45 degrees, a template image with an inclination of 45 degrees is set to the highest degree of priority, template images with an inclination of 0 degrees and 90 degrees are set to a high degree of priority, template images with an inclination of −45 degrees and 135 degrees are set to a low degree of priority, and a template image with an inclination of 225 degrees is set to the lowest degree of priority (refer to FIG. 14). In short, in an image captured by the camera portion 503, it may be generalized that in regions in which the angular position of the user is $\alpha$, a template image with an inclination of $\alpha$ is set to the highest degree of priority, a template image with an inclination of $\theta \pm 45$ degrees is set to a high degree priority, a template image with an inclination of $\alpha \pm 90$ degrees is set to a low degree of priority, and a template image with an inclination of α+180 degrees is set to the lowest degree of priority.

Figure 15:
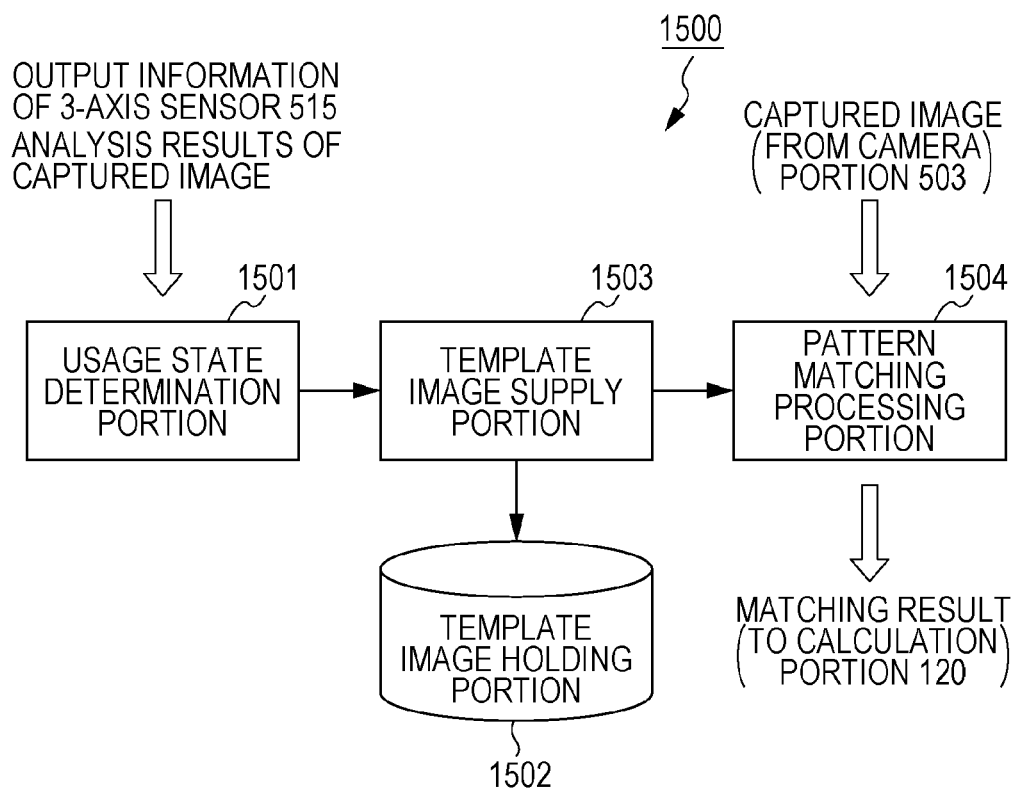
FIG. 15 is a diagram schematically showing a functional configuration of an object detection portion detecting an object, such as the face or a hand of a user, from an image captured by a camera portion in an image recognition portion.

In FIG. 15, a functional configuration of an object detection portion 1500 detecting an object, such as the face or a hand of a user, from an image captured by a camera portion 503 in an image recognition portion 504 is schematically shown.

The camera portion 503 captures an image of a user in front of a large screen the information processing apparatus 100 includes (for example, refer to FIGS. 8 to 10), and provides the captured image to the object detection portion 1500. The camera portion 503, for example, performs image capture N times in the space of one second, and outputs the captured image to the object detection portion 1500. Further, the object detection portion 1500 detects an object, such as the face or hand of a user, from the N image frames per second using the each of the plurality of template images of a face, a hand or the like at a frequency according to the usage state of the information processing apparatus 100.

As shown in FIG. 15, the object detection portion 1500 includes a usage state determination portion 1501, a template image holding portion 1502, a template image supply portion 1503, and a pattern matching processing portion 1504.

The usage state determination portion 1501 determines that actual usage state of the information processing apparatus 100. The usage state of the information processing apparatus 100 signifies whether or not the large screen of the main body of the information processing apparatus 100 is in the Wall state, that is, attached to a wall (for example, refer to FIG. 1 and FIG. 8), or in the Tabletop state, that is, placed flat, (for example, refer to FIG. 3A and FIG. 9). In a case of a state in which the main body of the information processing apparatus 100 is attached to a wall, whether the large screen is horizontal or vertical, that is, the rotation position $\Phi_c$ of the optical axis (roll axis rotation) of the camera portion 503 also signifies the usage state. In addition, in a case of a state in which the main body of the information processing apparatus 100 is placed flat (for example, refer to FIG. 2A and FIG. 10), the direction in which a user views the large screen also signifies the usage state, and the viewing angle is represented by the angular position α with respect to the direction $\Phi_c$ of the optical axis of the camera portion 503. The usage state determination portion 1501, for example, is able to determine the usage state based on the output information of the 3-axis sensor 515, the analysis result of the image captured by the camera portion 503, or the like.

The template image holding portion 1502, as shown in FIG. 11, holds a plurality of template images with different vertical direction inclinations for each object which is a detection target, such as the face or hand of a person. Moreover, because the image size of the subject in a captured image differs according to how near or far the subject is, it is necessary to perform normalization processing or to prepare template images with different sizes in which the inclination of the vertical direction is the same. However, in the present specification, the size of an image of an object, such as the face of a user included in a captured image, is handled as being normalized for simplicity of explanation.

The template image supply portion 1503 prioritizes each template image of an object of a specified detection target, such as a face, according to the usage state of the information processing apparatus 100 determined by the usage state determination portion 1501 and supplies the template image to the pattern matching processing portion 1504 at a frequency according to the priority.

The usage state determination portion 1501 determines that the main body of the information processing apparatus 100 is attached to a wall such that the large screen is arranged horizontal, that is, is in a usage state in which the direction of the optical axis of the camera portion 503 is set to ($\phi_c$, $\theta_c$, $\Phi_c$)=(0, 0, 0). In this case, the template image supply portion 1503, as shown in FIG. 12, sets a template image with an inclination of 0 degrees to the highest degree of priority, a template image with an inclination of ±45 degrees to the next highest degree of priority, a template image with an inclination of ±90 degrees to a low degree of priority and a template image with an inclination of 180 degrees to the lowest degree of priority.

Figure 13:
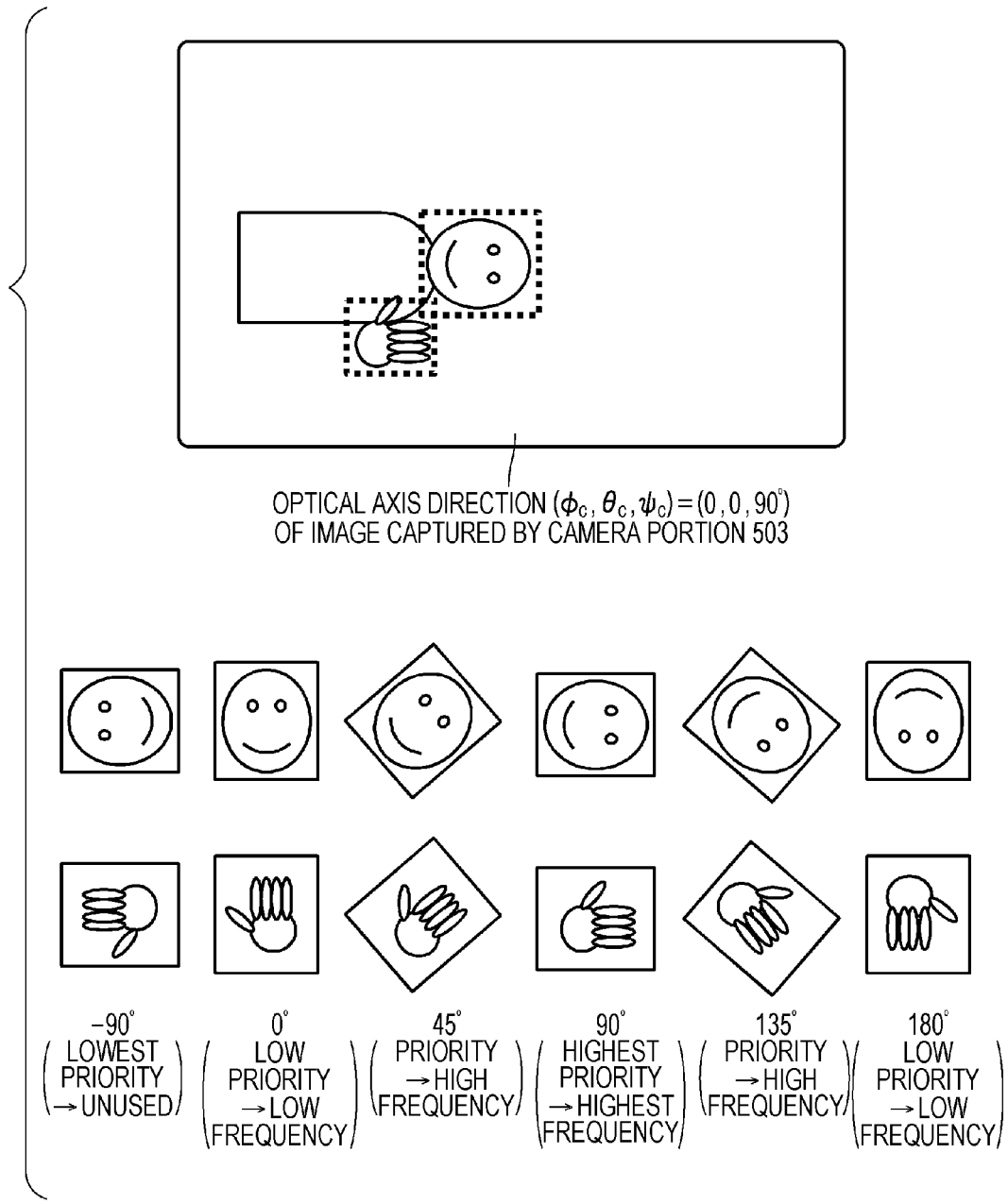
FIG. 13 is a diagram showing a degree of priority set for each template image in a usage state in which the direction of the optical axis of a camera portion is set to $(\phi_c, \theta_c, \Phi_c)=(0, 0, 90°)$.

In addition, the usage state determination portion 1501 determines that the main body of the information processing apparatus 100 is attached to a wall such that the large screen is arranged vertical, that is, is in a usage state in which the direction of the optical axis of the camera portion 503 is set to ($\phi_c$, $\theta_c$, $\Phi_c$)=(0, 0, 90°). In this case, the template image supply portion 1503, as shown in FIG. 13, sets a template image with an inclination of 90 degrees to the highest degree of priority, template images with an inclination of 45 degrees (and 135 degrees) to the next highest degree of priority, template images with an inclination of 0 degrees and 180 degrees to a low degree of priority and a template image with an inclination of 270 degrees to the lowest degree of priority.

Figure 14:
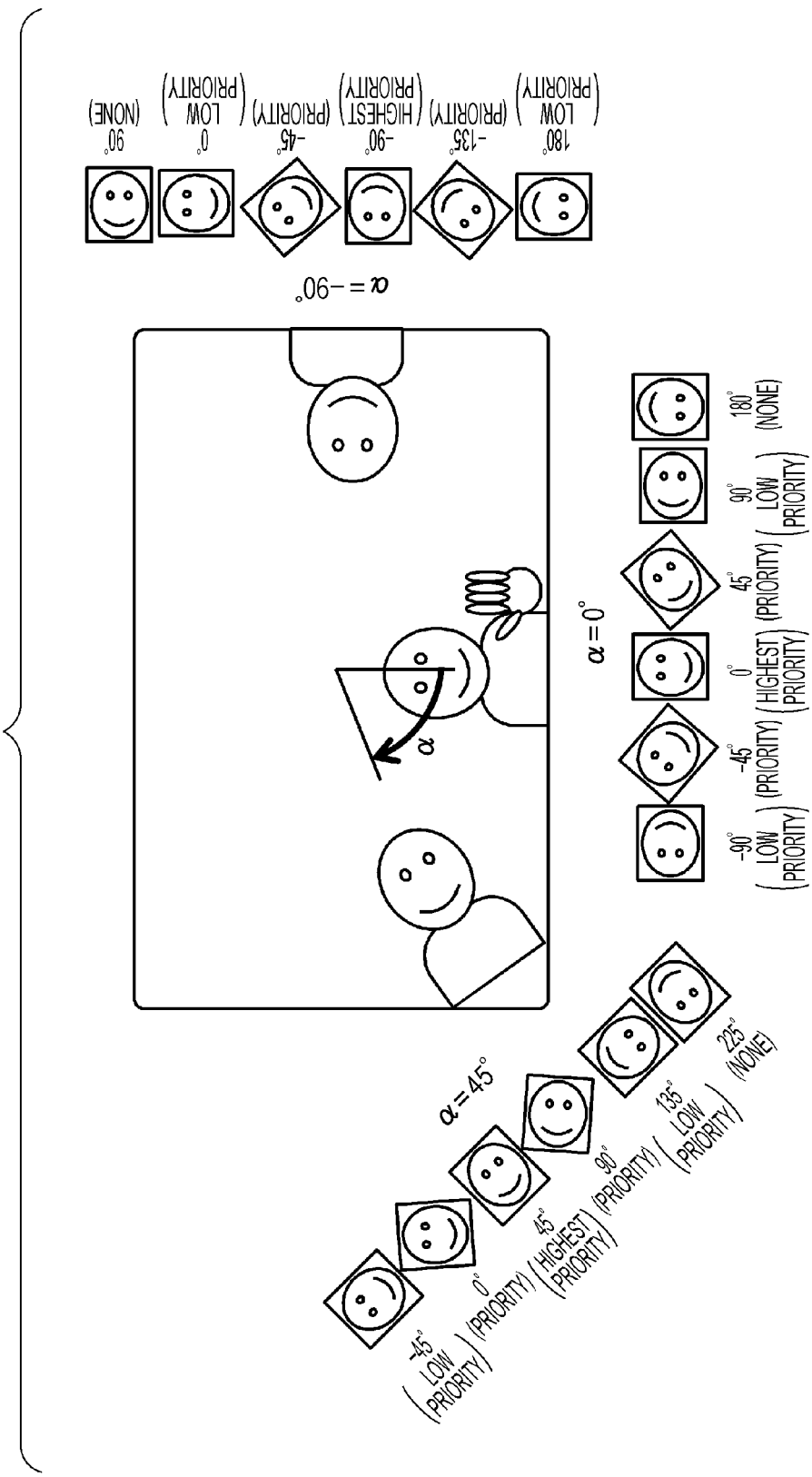
FIG. 14 is a diagram showing a degree of priority set for each template image in a usage state in which the direction of the optical axis of a camera portion is set to $(\phi_c, \theta_c, \Phi_c)=(0, 90°, 0)$.

In addition, the usage state determination portion 1501 determines that the main body of the information processing apparatus 100 is removed from a wall and placed flat, that is, is in a usage state in which the direction of the optical axis of the camera portion 503 is set to ($\phi_c$, $\theta_c$, $\Phi_c$)=(0, 90°, 0). In this case, as shown in FIG. 14, in regions in which the angular position of the user is a in an image captured by the camera portion 503, the template image supply portion 1503 sets a template image with an inclination of a to the highest degree of priority, a template image with an inclination of θ±45 degrees to a high degree of priority, a template image with an inclination of α±90 degrees to a low priority, and a template image with an inclination of α+180 degrees to the lowest priority.

Further, the template image supply portion 1503 outputs each template image to the pattern matching processing portion 1504 at a frequency according to the respective degree of priority thereof. For example, a template image with the highest degree of priority is output at a frequency of four out of ten times, a template image with the next highest degree of priority at a frequency of two out of ten times, a template image with a low degree of priority is output at a frequency of one out of ten times and a template image with the lowest degree of priority is not output at all.

Figure 16:
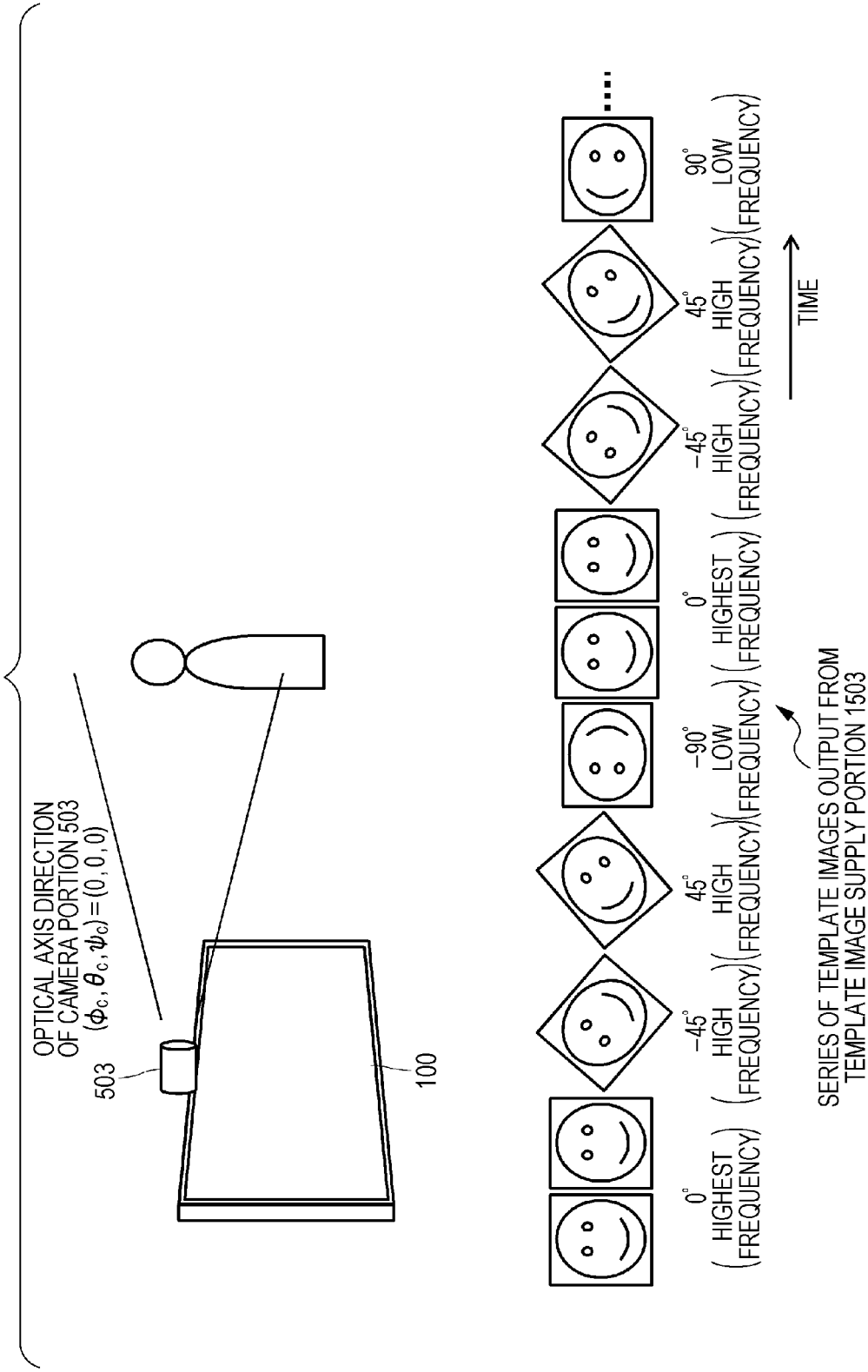
FIG. 16 is a diagram showing a condition in which each template image is supplied from a template image supply portion at a frequency according to the degree of priority in a usage state in which the direction of the optical axis of the camera portion is set to $(\phi_c, \theta_c, \Phi_c)=(0, 0, 0)$.

In a usage state in which the direction of the optical axis of the camera portion 503 is set to ($\phi_c$, $\theta_c$, $\Phi_c$)=(0, 0, 0), the template image supply portion 1503, for example, as shown in FIG. 16, outputs a template image with an inclination of 0 degrees at a frequency of four out of ten times, template images with an inclination of ±45 degrees two out of ten times, and template images with an inclination of ±90 degrees once every ten times each.

Figure 17:
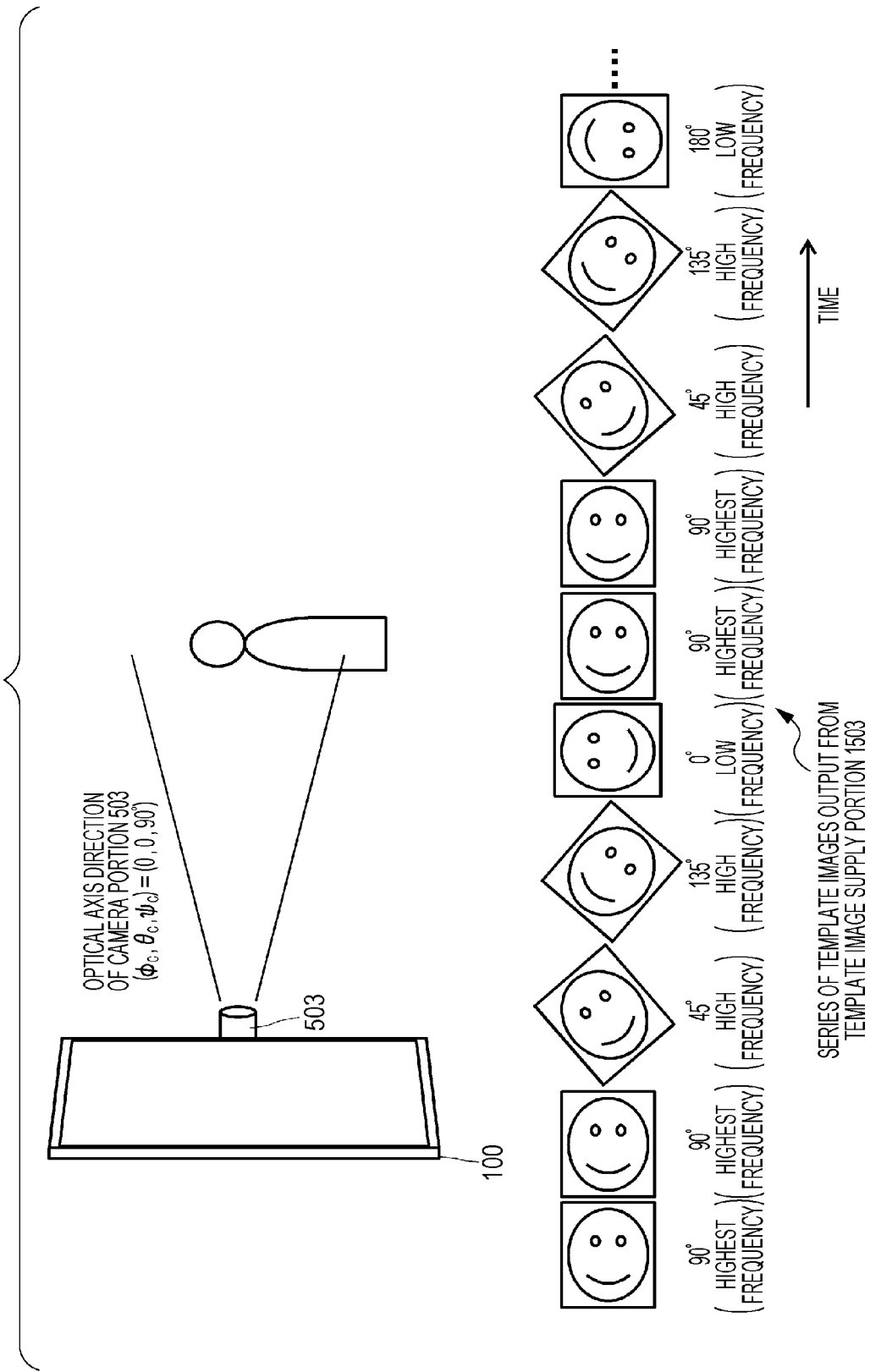
FIG. 17 is a diagram showing a condition in which each template image is supplied from a template image supply portion at a frequency according to the degree of priority in a usage state in which the direction of the optical axis of the camera portion is set to $(\phi_c, \theta_c, \Phi_c)=(0, 0, 90°)$.

In addition, in a usage state in which the direction of the optical axis of the camera portion 503 is set to ($\phi_c$, $\theta_c$, $\Phi_c$)=(0, 0, 90°), the template image supply portion 1503, for example, as shown in FIG. 17, outputs a template image with an inclination of 90 degrees at a frequency of four out of ten times, template images with an inclination of 45 degrees (and 135 degrees) two out of ten times each, and template images with an inclination of 0 degrees and 180 degrees once every ten times each.

In addition, in a usage state in which the main body of the information processing apparatus 100 is removed from a wall and placed flat, and the direction of the optical axis of the camera portion 503 is set to $(\phi_c, \theta_c, \Phi_c)=(0, 90°, 0)$, the template image supply portion 1503 outputs each template image at a frequency according to the angular position α of the user in an image captured by the camera portion 503. For example, as shown in gray in FIG. 18, when detecting a face image (object) in regions in which the angular position α of the user is −90 degrees, a template image with an inclination of −90 degrees is output at a frequency of four out of ten times, template images with an inclination of −45 degrees and −135 degrees are each output two out of ten times, and template images with an inclination of 0 degrees and 180 degrees are each output one out of ten times.

Captured images are input to the pattern matching processing portion 1504 from the camera portion 503 at a frame rate of, for example, N frames a second. For example, N=10. In addition, template images are respectively supplied from the template image supply portion 1503 to the pattern matching processing portion 1504 at a frequency according to the usage state of the main body of the information processing apparatus 100, as shown in FIGS. 16 to 18. The pattern matching processing portion 1504 sequentially performs face image detection by performing pattern matching on the captured images input from the camera portion 503 at 10 fps using the template images supplied from the template image supply portion 1503.

Figure 19:
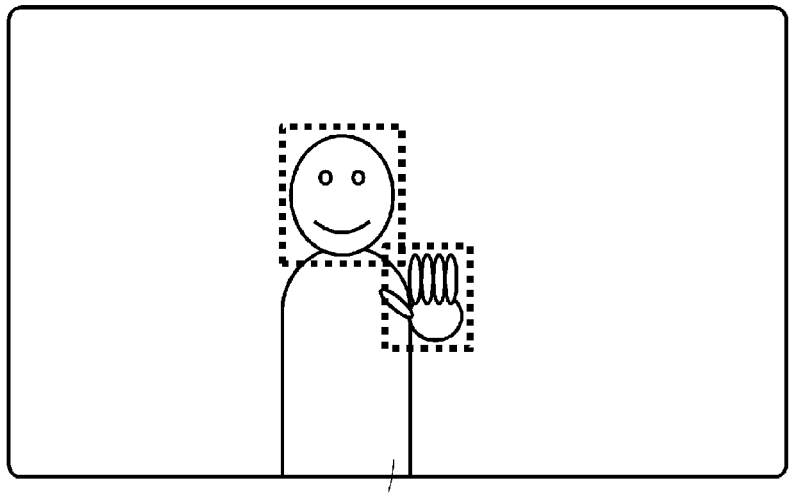
FIG. 19 is a diagram showing an example of a captured image for which a usage state in which the direction of the optical axis of a camera portion is set to $(\phi_c, \theta_c, \Phi_c)=(0, 0, 0)$ is assumed.

For example, in a usage state in which the direction of the optical axis of the camera portion 503 is set to $(\phi_c, \theta_c, \Phi_c)=(0, 0, 0)$, as shown in FIG. 19, the inclination of the face image in the captured image is assumed to be in the vicinity of 0 degrees. Accordingly, as shown in FIG. 16, when pattern matching is performed with respect to the captured images input from the camera portion 503 at 10 fps using a template image with an inclination of 0 degrees at a frequency of four out of ten times, template images with an inclination of ±45 degrees at a frequency of two out of ten times each, and template images with an inclination of ±90 degrees at a frequency of one out of ten times each, it is possible for the pattern matching processing portion 1504 to reduce the processing load and efficiently detect a face image.

Figure 20:
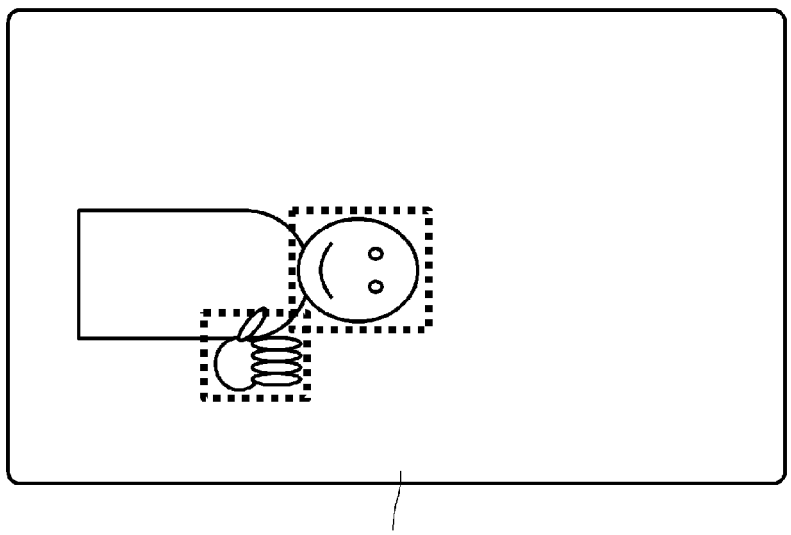
FIG. 20 is a diagram showing an example of a captured image for which a usage state in which the direction of the optical axis of a camera portion is set to $(\phi_c, \theta_c, \Phi_c)=(0, 0, 90°)$ is assumed.

In addition, in a usage state in which the direction of the optical axis of the camera portion 503 is set to $(\phi_c, \theta_c, \Phi_c)=(0, 0, 90°)$, as shown in FIG. 20, the inclination of the face image in the captured image is assumed to be in the vicinity of 90 degrees. Accordingly, as shown in FIG. 17, when pattern matching is performed with respect to the captured images input from the camera portion 503 at 10 fps using a template image with an inclination of 90 degrees at a frequency of four out of ten times, template images with an inclination of 45 degrees (and 135 degrees) at a frequency of two out of ten times each, and template images with an inclination of 0 degrees and 180 degrees at a frequency of one out of ten times each, it is possible for the pattern matching processing portion 1504 to reduce the processing load and efficiently detect a face image.

Figure 21:
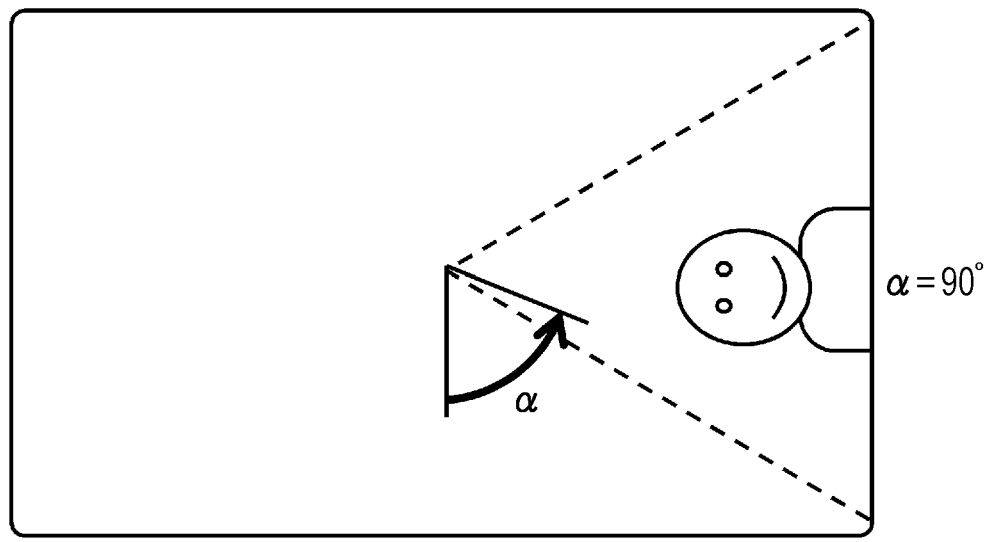
FIG. 21 is a diagram showing an example of a captured image for which a usage state in which the main body of an information processing apparatus is removed from a wall and placed flat.

In addition, in a usage state in which the main body of the information processing apparatus 100 is removed from a wall and placed flat, and the direction of the optical axis of the camera portion 503 is set to $(\phi_c, \theta_c, \Phi_c)=(0, 90°, 0)$, for example, when face detection is performed in regions shown in gray in the captured image shown in FIG. 21 in which the angular position α of the user is −90 degrees, the inclination of the face image is assumed to be in the vicinity of −90 degrees. Accordingly, as shown in FIG. 18, when pattern matching is performed with respect to the captured images input from the camera portion 503 at 10 fps using a template image with an inclination of −90 degrees at a frequency of four out of ten times, template images with an inclination of −45 degrees and −135 degrees at a frequency of two out of ten times each, and template images with an inclination of 0 degrees and 180 degrees at a frequency of one out of ten times each, it is possible for the pattern matching processing portion 1504 to reduce the processing load and efficiently detect a face image.

The image recognition portion 504 outputs the object detection results, such as a face image in the object detection portion 1500, to the calculation portion 120 via the input interface integration portion 520. In the calculation portion 120, it is possible to use the object detection results for a variety of uses, such as facial recognition, personal authentication, or gesture input, based on the detected face image.

Figure 22:
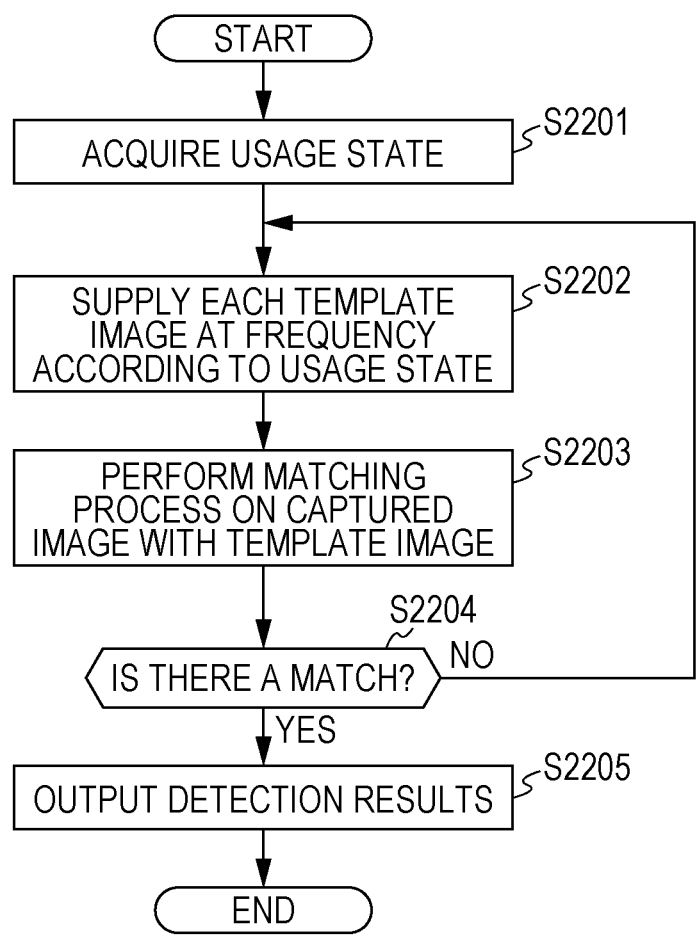
FIG. 22 is a flowchart showing a processing procedure for an object detection portion to detect a desired object from a captured image.

In FIG. 22, a processing procedure for an object detection portion 1500 to detect a desired object from a captured image is shown in flowchart format.

The usage state determination portion 1501 determines the usage state of the information processing apparatus 100 when the camera portion 503 captures an image based on, for example, output information from the 3-axis sensor 515, analysis results of an image captured by the camera portion 503, or the like (Step S2201).

The template image supply portion 1503 prioritizes each template image of an object of a specified detection target, such as a face, according to the usage state of the information processing apparatus 100 determined by the usage state determination portion 1501 and supplies the template image to the pattern matching processing portion 1504 at a frequency according to the priority (Step S2202).

The pattern matching processing portion 1504 performs a matching process with respect to captured images input from the camera portion 503 at 10 fps using the template images supplied from the template image supply portion 1503 at a frequency according to the priority (Step S2203).

Further, the pattern matching processing portion 1504 finishes the present processing routine by outputting the detection results to the calculation portion 120 (Step S2205) when a region matching a template image is detected from the captured image (Yes in Step S2204).

In addition, when the pattern matching processing portion 1504 is unable to detect a region matching the template image (No in Step S2204) from the captured image, the process returns to Step S2202, and pattern matching is repeated with respect to captured images input from the camera portion 503, using a template image (with a different inclination) next supplied from the template image supply portion 1503.

C. Optimization Process of Captured Image According to Usage State

Self-photographing, in which the user makes themselves the subject by facing the lens of the camera portion 530 towards at their own body, is known as one usage state of an information terminal in which the apparatus main body and a camera are integrates, such as in the information processing apparatus 100 according to the present embodiment (for example, refer to Japanese Unexamined Patent Application Publication No. 2011-19051).

In an ordinary camera, in a state in which the user faces the lens towards themselves, because the viewfinder faces the opposite side and the user may be unable to verify the composition, it is difficult to capture an image as intended. In contrast, in a case in which the optical axis of the camera portion 503 and the optical axis of the large screen face the same direction, such as in the information processing apparatus 100 according to the present embodiment, the user is able to self-photograph while checking the composition by viewing the captured image displayed on the large screen.

As described above, the main body of the information processing apparatus 100 is provided in a rotatable and an attachable and detachable state on the wall by the rotation/attachment mechanism portion 180, and is able to set the rotational position to posture in which the large screen is horizontal, or a posture in which the large screen is vertical. When considering verifying the composition by viewing the large screen during self-photographing of a user, it is necessary to evenly arrange the vertical position of the image captured by camera portion 503 and face and display the figure of the user in the captured image, even with the large screen in either of the horizontal or vertical rotational positions.

Figure 23:
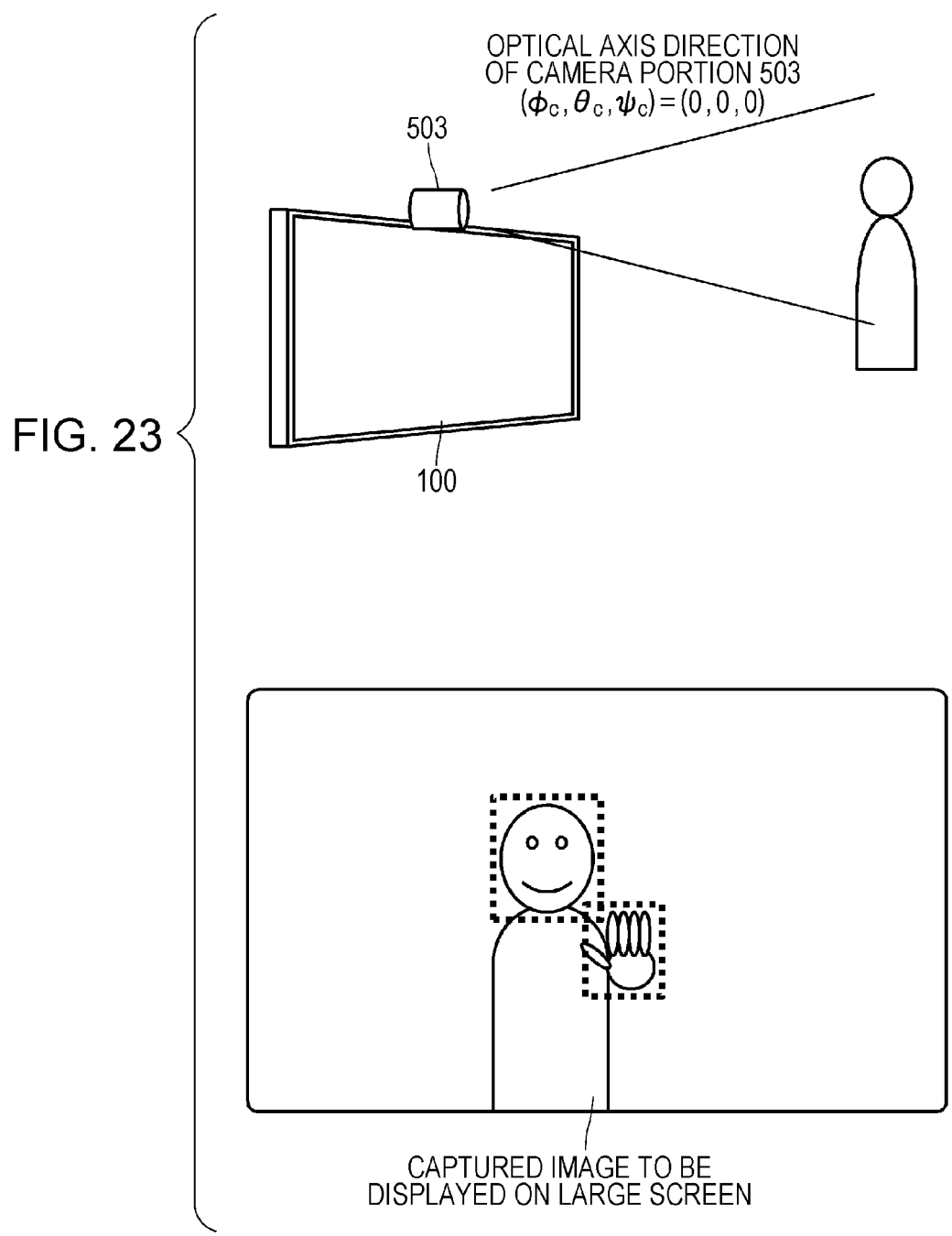
FIG. 23 is a diagram showing a condition in which the vertical direction of an image captured by a camera portion displayed so as to be correct in a state in which the rotational position of the main body of the information processing apparatus is set such that the large screen has a horizontal posture.
Figure 24:
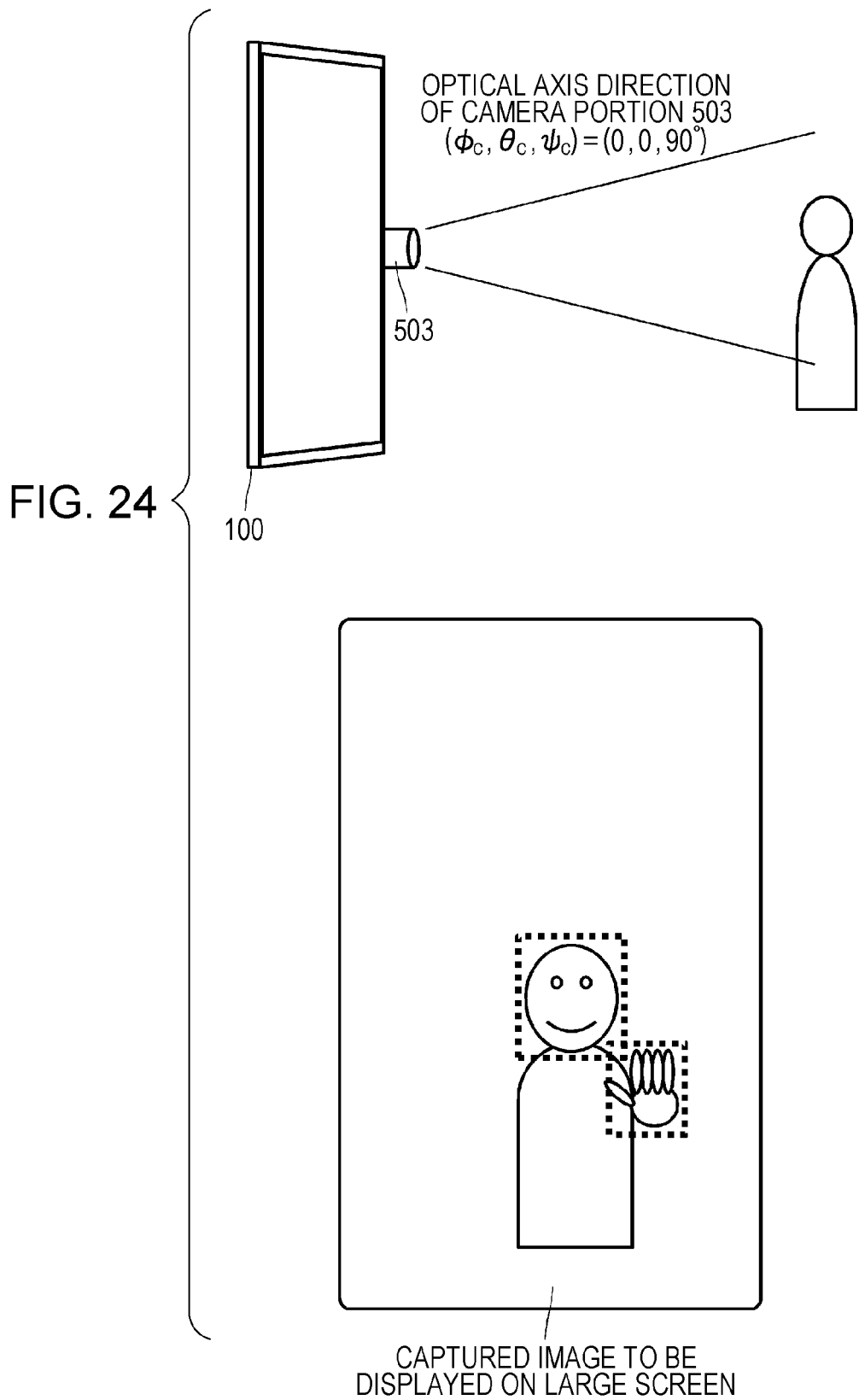
FIG. 24 is a diagram showing a condition in which the vertical direction of an image captured by a camera portion displayed so as to be correct in a state in which the rotational position of the main body of the information processing apparatus is set such that the large screen has a vertical posture.

For example, in a state in which the rotational position of the main body of the information processing apparatus 100 is set such that the large screen has a horizontal posture, as shown in FIG. 23, is necessary to display the image captured by the camera portion 503 such that the vertical direction is correct. Similarly, in a state in which the rotational position of the main body of the information processing apparatus 100 is set such that the large screen has a vertical posture, as shown in FIG. 24, it is necessary to display the image captured by the camera portion 503 such that the vertical direction is correct.

Figure 25:
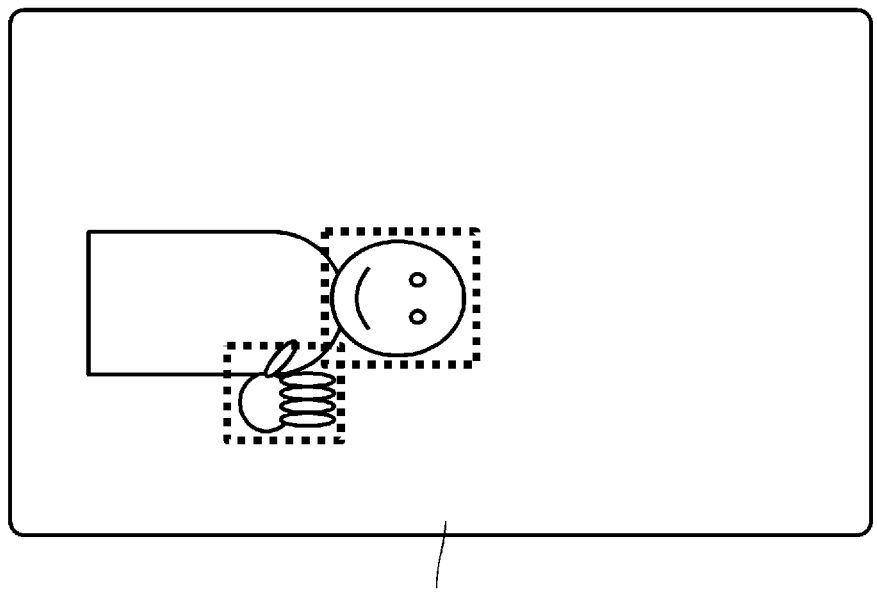
FIG. 25 is a diagram showing an example of a captured image which is self-photographed with the camera portion in a state in which the direction of the optical axis is $(\phi_c, \theta_c, \Phi_c)=(0, 0, 90°)$.
Figure 26:
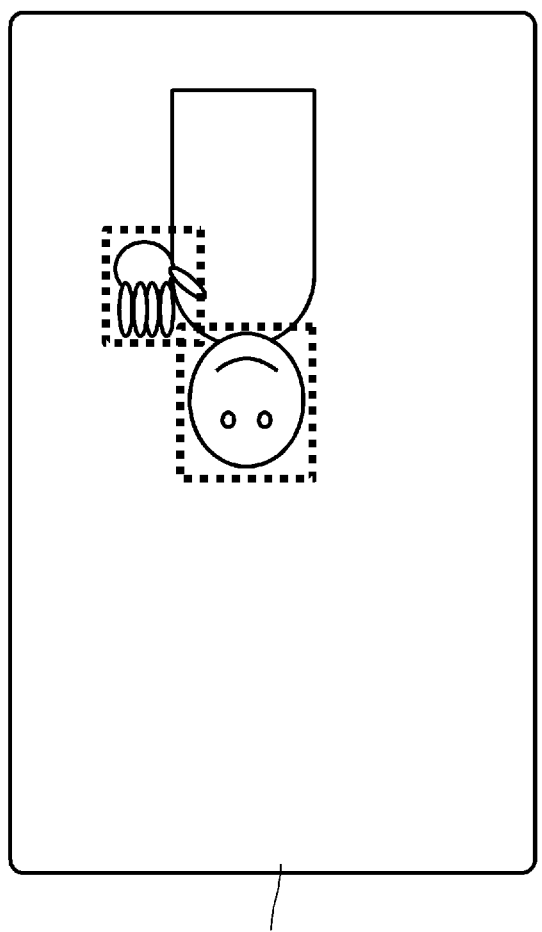
FIG. 26 is a diagram showing a condition in which a captured image shown in FIG. 25 is displayed on a large screen with the optical axis direction at $(\phi_c, \theta_c, \Phi_c)=(0, 0, 90°)$.

However, in a state in which the rotational position of the main body of the information processing apparatus 100 is set such that the large screen has a vertical posture, since the direction of the optical axis of the camera portion 503 becomes $(\phi_c, \theta_c, \Phi_c)=(0, 0, 90°)$, the captured image becomes as shown in FIG. 25. In addition, in a state in which the rotational position of the main body of the information processing apparatus 100 is set such that the large screen has a vertical posture, the optical axis (roll axis rotation) of the large screen rotates 90 degrees and becomes $(\phi_d, \theta_d, \Phi_d)=(0, 0, 90°)$. Therefore, when a captured image shown in FIG. 25 is displayed as is on the large screen with the optical axis facing $(\phi_d, \theta_d, \Phi_d)=(0, 0, 90°)$, the optical axis of the captured image becomes $(0, 0, 90+90°)$, and the vertical direction is completely reversed as shown in FIG. 26.

Here, in the present embodiment, the display of the captured image is optimized inside the information processing apparatus 100 such that the vertical direction of the captured image displayed on the large screen is corrected and the figure of the user is faced and displayed, based on displacement of the direction of the optical axis of the camera portion 503 with which the user is self-photographing and displacement of the direction of the optical axis of the large screen displaying the self-photographed image captured by the camera portion 503.

Figure 27:
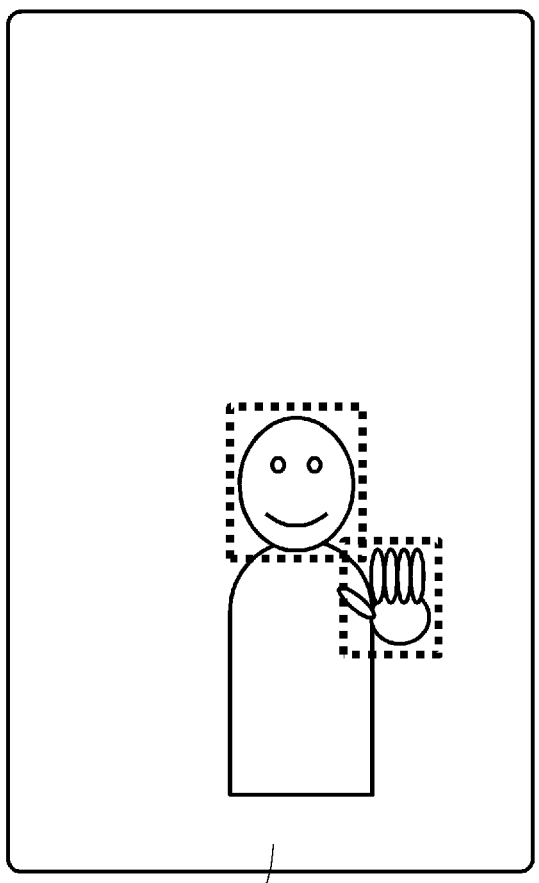
FIG. 27 is a diagram showing a condition in which a captured image shown in FIG. 25 is optimized and displayed.

For example, in a case in which $(\phi_d, \theta_d, \Phi_d)=(0, 0, \Delta\Phi_d)$ by displacing the optical axis of the larger screen by $\Delta\Phi_c$ only with $\Phi$ axis rotation along with setting $(\phi_c, \theta_c, \Phi_c)=(0, 0, \Delta\Phi_c)$ by displacing the optical axis of the camera portion 503 by $\Delta\Phi_c$ only with $\Phi$ axis rotation, the captured image is rotated by $-(\Delta\Phi_c+\Delta\Phi_d)$ with $\Phi$ axis rotation, and is displayed in a state in which the optical axis is set to $(\Phi_p, \theta_p, \Phi_p)=(0, 0, 0)$, as shown in FIG. 27.

In a case in which the main body of the information processing apparatus 100 and the camera portion 503 are integrated as in the present embodiment, $\Delta\Phi_c=\Delta\Phi_d$ is achieved. In addition, in the examples shown in FIG. 25 and FIG. 26, $\Delta\Phi_c=\Delta\Phi_d=-90°$. Accordingly, with respect to a self-photographed capture image, it is possible to optimize the vertical direction of the captured image so as to be correct if displayed on a large screen by being rotated by $=(\Delta\Phi_c+\Delta\Phi_c)=-180°$ with $\Phi$ axis rotation.

Figure 28:
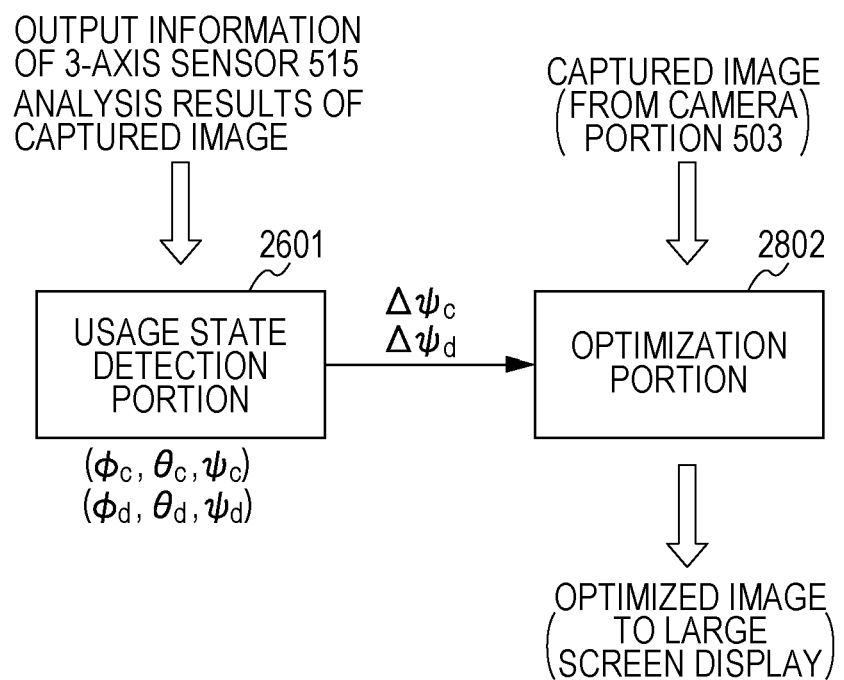
FIG. 28 is a diagram schematically showing a functional configuration performing an optimization process on an image captured by a camera portion.

The optimization process on an image captured by the camera portion when self-photographing is performed is executed, for example, in the calculation portion 120. A functional configuration performing an optimization process on an image captured by a camera portion 503 is schematically shown in FIG. 28.

The usage state detection portion 2801 detects the usage state of the information processing apparatus 100 when self-photographing is performed with the camera portion 503. Here, the usage state, specifically, is the direction $(\phi_c, \theta_c, \Phi_c)$ of the optical axis of the camera portion 503 which is self-photographing and the direction $(\phi_d, \theta_d, \Phi_d)$ of the optical axis of the large screen displaying the captured image. The usage state detection portion 2801, for example, is able to detect the usage state based on the output information of the 3-axis sensor 515, the analysis result of the image captured by the camera portion 503, or the like.

The optimization portion 2802 performs optimization the optimization process such that the vertical direction is corrected when displaying an image captured by the camera portion 503 on the large screen when the direction $(\phi_c, \theta_c, \Phi_c)$ of the optical axis of the camera portion 503 and the direction $(\phi_d, \theta_d, \Phi_d)$ of the optical axis of the large screen are input from the usage state detection portion 2801.

Figure 29:
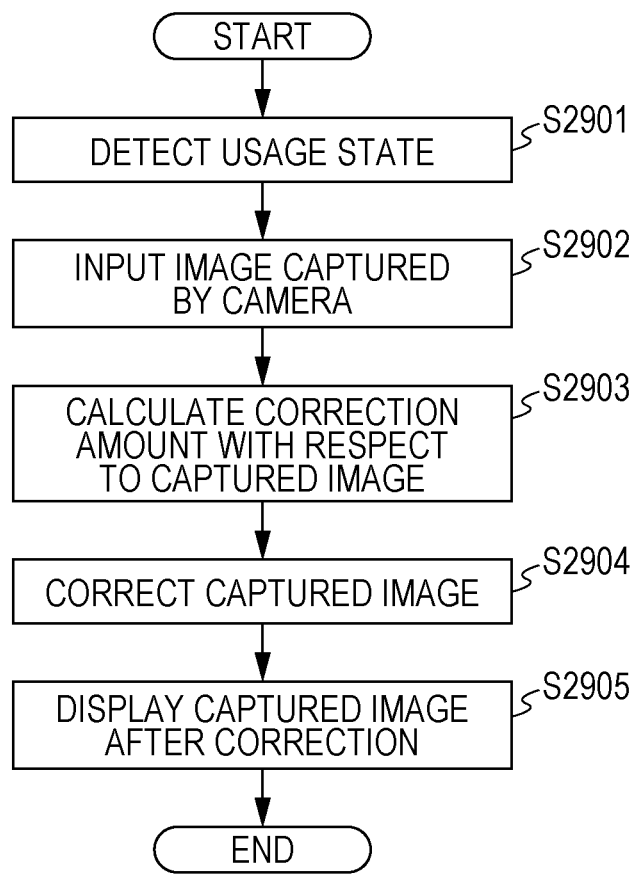
FIG. 29 is a flowchart showing a processing procedure for performing an optimization process on an image captured by a camera portion.

In FIG. 29, a processing procedure for performing an optimization process on an image captured by a camera portion 503 is shown in flowchart format. The processing procedure shown, for example, is realized in a form in which the calculation portion 120 executes a predetermined image processing application.

The usage state detection portion 2801, for example, detects the actual usage state of the information processing apparatus 100 based on the output information of the 3-axis sensor 515, the analysis results of the image captured by the camera portion 503, or the like (Step 2901). As the usage state, specifically, the optical axis direction $(\phi_c, \theta_c, \Phi_c)$ of the camera portion 503, and the optical axis direction $(\phi_d, \theta_d, \Phi_d)$ of the large screen of the information processing apparatus 100 are detected.

In addition, the captured image is input from the camera portion 503 (Step S2902).

The optimization portion 2802 calculates a correction amount with respect to the captured image when the optical axis direction $(\phi_c, \theta_c, \Phi_c)$ of the camera portion 503 and the optical axis direction $(\phi_d, \theta_d, \Phi_d)$ of the large screen of the information processing apparatus 100 are input from the usage state detection portion 2801 (Step S2903).

For example, $-(\Delta\Phi_c+\Delta\Phi_d)$ in $\Phi$ axis rotation is calculated as the correction amount for the captured image in a case in which the optical axis of the camera portion 503 becoming $(\phi_c, \theta_c, \Phi_c)=(0, 0, \Delta\Phi_c)$ by displacing by $\Delta\Phi_c$ in the $\Phi$ axis direction, and the optical axis of the large screen becoming $(\phi_d, \theta_d, \Phi_d)=(0, 0, \Delta\Phi_d)$ by displacing by $\Delta\Phi_d$ only in the $\Phi$ axis direction is detected.

Further, the optimization portion 2802 corrects the captured image based on the calculated correction amount (Step S2904). The captured image after correction is displayed on the larger screen (Step S2905). For the captured image displayed on the large screen, since the figure of the user for which the vertical direction is corrected is displayed, as shown in FIG. 27, the user is able to face and observe the figure.

Moreover, the technology disclosed in the present specification is able to take the following configurations:

(1) An image processing apparatus including a usage state determination portion determining a usage state of a camera portion; and an object detection portion detecting an object from an image captured by the camera portion using a plurality of methods, in which the object detection portion detects the object from the captured image by prioritizing the plurality of methods based on the usage state.

(2) The image processing apparatus according to (1), in which the object detection portion includes a plurality of template images, prioritizes the plurality of template images based on the usage state, and detects the object by performing pattern matching with the captured image on each template image with a frequency according to priority.

(3) The image processing apparatus according to (2), in which the usage state determination portion determines a posture when the camera portion captures an image of the object, and the object detection portion prioritizes a plurality of template images in which the inclination of the object is different according to the posture of the camera portion, and detects the object by performing pattern matching with the captured image on each template image in which the inclination is different with a frequency according to the priority.

(4) The image processing apparatus according to (3), in which the usage state determination portion determines a direction of an optical axis when the camera portion captures an image of the object, and the object detection portion prioritizes each template image based on the determined direction of the optical axis, and detects the object by performing pattern matching with the captured image on each template image in which the inclination is different with a frequency according to the priority.

(5) The image processing apparatus according to (4), in which the usage state determination portion determines the angle of rotation of roll rotation of the optical axis of the camera portion, and the object detection portion applies a higher priority than the template image having an inclination close to the angle of rotation of roll rotation of the optical axis of the camera portion.

(6) The image processing apparatus according to (3), in which the object detection portion prioritizes each template image for each region of the captured image, and detects the object by performing pattern matching with the captured image on each template image in which the inclination is different with a frequency according to the priority.

(7) The image processing apparatus according to (6), in which when the optical axis of the camera portion faces the vertical direction, the object detection portion prioritizes each template image according to the angular position of the region with respect to the optical axis of the image captured apparatus for each region of the captured image.

(8) An image processing apparatus including a usage state detection portion detecting a usage state of a camera portion; and an optimization portion optimizing an image captured by the camera portion based on the usage state.

(9) The image processing apparatus according to (8), further including a display portion displaying the captured image on a screen, in which the optimization portion optimizes the captured image in which an image of a user is captured so as to be displayed on the screen facing the user.

(10) The image processing apparatus according to (9), in which the usage state detection portion detects a direction of the optical axis of the camera portion and a direction of the optical axis of the screen, and the optimization portion optimizes the captured image based on the direction of the optical axis of the camera portion and the direction of the optical axis of the screen.

(11) The image processing apparatus according to (9), in which the usage state detection portion detects the rotation $\Delta\Phi_c$ of roll axis rotation of the optical axis of the camera portion and the rotation $\Delta\Phi_d$ of roll rotation of the optical axis of the screen, and the optimization portion causes the captured image to rotate by $-(\Delta\Phi_c+\Delta\Phi_d)$ only to the $\Phi$ axis rotation.

(12) An image processing method including determining a usage state of a camera portion; and detecting an object from an image captured by the camera portion using a plurality of methods; in which in the detecting of the object, the object is detected from the captured image by prioritizing the plurality of methods based on the usage state.

(13) An image processing method including detecting a usage state of a camera portion; and optimizing an image captured by the camera portion based on the usage state.

(14) An image capture apparatus including a camera portion; a usage state determination portion determining a usage state of the camera portion; and an object detection portion detecting an object from an image captured by the camera portion using a plurality of methods, in which the object detection portion detects the object from the captured image by prioritizing the plurality of methods based on the usage state.

(15) An image capture apparatus including a camera portion; a usage state detection portion detecting a usage state of the camera portion; and an optimization portion optimizing an image captured by the camera portion based on the usage state.

(16) A computer program recorded in a computer readable format, causing a computer to function as a usage state determination portion determining a usage state of a camera portion; and an object detection portion detecting an object from an image captured by the camera portion with a plurality of methods, in which the object detection portion detects the object from the captured image by prioritizing the plurality of methods based on the usage state.

(17) A computer program recorded in a computer readable format, causing a computer to function as a usage state detection portion detecting a usage state of a camera portion; and an optimization portion optimizing an image captured by the camera portion based on the usage state.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing apparatus comprising:
   a usage state determination portion determining a usage state of a camera portion; and
   an object detection portion detecting an object from an image captured by the camera portion using a plurality of template images,
   wherein the object detection portion detects the object from the captured image by prioritizing the plurality of template images based on the usage state of the camera portion.
2. The image processing apparatus according to claim 1, wherein the object detection portion includes the plurality of template images and detects the object by performing pattern matching with the captured image on each template image with a frequency according to the priority.
3. The image processing apparatus according to claim 2, wherein the usage state determination portion determines a posture when the camera portion captures the image of the object, and the object detection portion prioritizes the plurality of template images in which the inclination of the object is different according to the posture of the camera portion, and detects the object by performing pattern matching with the captured image on each template image in which the inclination is different with a frequency according to the priority.

4. The image processing apparatus according to claim 3, wherein the usage state determination portion determines a direction of an optical axis when the camera portion captures the image of the object, and the object detection portion prioritizes each template image based on the determined direction of the optical axis, and detects the object by performing pattern matching with the captured image on each template image in which the inclination is different with a frequency according to the priority.

5. The image processing apparatus according to claim 4, wherein the usage state determination portion determines an angle of rotation of roll rotation of the optical axis of the camera portion, and the object detection portion applies a higher priority than the template image having an inclination close to the angle of rotation of roll rotation of the optical axis of the camera portion.

6. The image processing apparatus according to claim 3, wherein the object detection portion prioritizes each template image for each region of the captured image, and detects the object by performing pattern matching with the captured image on each template image in which the inclination is different with a frequency according to the priority.

7. The image processing apparatus according to claim 6, wherein when an optical axis of the camera portion faces the vertical direction, the object detection portion prioritizes each template image according to an angular position of the region with respect to the optical axis of the camera portion for each region of the captured image.

8. An image processing method comprising:
determining a usage state of a camera portion; and
detecting an object from an image captured by the camera portion using a plurality of template images,
wherein in the detecting of the object, the object is detected from the captured image by prioritizing the plurality of template images based on the usage state of the camera portion.

9. An image capture apparatus comprising:
a camera portion;
a usage state determination portion determining a usage state of the camera portion, wherein the usage state is a state in which an optical axis of the camera portion faces the vertical direction; and
an object detection portion detecting an object from an image captured by the camera portion using a plurality of template images,
wherein the object detection portion detects the object from the captured image by prioritizing the plurality of template images based on an angular position of a region with respect to the optical axis of the camera portion for each region of the captured image.

10. A non-transitory computer-readable storage medium having stored thereon, a set of computer-executable instructions which when executed by a computer, causes the computer to execute steps comprising:
in an image processing apparatus comprising at least one processor and a memory storing instructions for execution by the at least one processor:
determining a usage state of a camera portion; and
detecting an object from an image captured by the camera portion using a plurality of template images,
wherein in the detecting of the object, the object is detected from the captured image by prioritizing the plurality of template images based on the usage state of the camera portion.

* * * * *